(12) United States Patent
Endle et al.

(10) Patent No.: US 8,537,470 B2
(45) Date of Patent: *Sep. 17, 2013

(54) METHODS OF FORMING SHEETING WITH COMPOSITE IMAGES THAT FLOAT AND SHEETING WITH COMPOSITE IMAGES THAT FLOAT

(75) Inventors: James P. Endle, New Richmond, WI (US); Lynn E. Lorimor, Minneapolis, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 38 days.

This patent is subject to a terminal disclaimer.

(21) Appl. No.: 13/344,718

(22) Filed: Jan. 6, 2012

(65) Prior Publication Data

US 2012/0107734 A1 May 3, 2012

Related U.S. Application Data

(63) Continuation of application No. 12/257,182, filed on Oct. 23, 2008, now Pat. No. 8,111,463.

(51) Int. Cl.
*G02B 27/10* (2006.01)

(52) U.S. Cl.
USPC .......................................... 359/620; 359/619

(58) Field of Classification Search
USPC ................. 359/619, 620, 625–627, 455, 456, 359/45
See application file for complete search history.

(56) References Cited

U.S. PATENT DOCUMENTS

| | | | |
|---|---|---|---|
| 1,905,716 A | 4/1933 | Ives | |
| 1,918,705 A | 7/1933 | Ives | |
| 2,039,648 A | 5/1936 | Ives | |
| 2,063,985 A | 12/1936 | Coffey | |
| 2,279,825 A | 4/1942 | Kaszab | |
| 2,326,634 A | 8/1943 | Gebhard et al. | |
| 2,500,511 A | 3/1950 | Bonnet | |
| 2,622,472 A | 12/1952 | Bonnet | |
| 2,833,176 A | 5/1958 | Ossoinak | |
| 3,154,872 A | 11/1964 | Nordgren | |
| 3,161,509 A | 12/1964 | Howe et al. | |
| 3,306,974 A | 2/1967 | Cunnally | |

(Continued)

FOREIGN PATENT DOCUMENTS

| CA | 2326180 | 10/1999 |
|---|---|---|
| CA | 2400894 | 8/2001 |

(Continued)

OTHER PUBLICATIONS

De Montebello, "Processing and Display of Three-Dimensional Data II", Proceedings of SPIE, vol. 507, San Diego, 1984.

(Continued)

*Primary Examiner* — Scott J Sugarman
*Assistant Examiner* — Vipin Patel
(74) *Attorney, Agent, or Firm* — Sandra K. Nowak

(57) ABSTRACT

Microlens sheetings with different types of composite images are disclosed, in which the composite image floats above, in, or below the sheeting, or some combination. One type of composite image may be viewable to the unaided eye or an observer and another type of composite image is viewable only to the aided eye of an observer. Methods for providing such an imaged sheeting are also disclosed.

21 Claims, 24 Drawing Sheets

(56) References Cited

U.S. PATENT DOCUMENTS

| | | | |
|---|---|---|---|
| 3,357,770 | A | 12/1967 | Clay |
| 3,365,350 | A | 1/1968 | Cahn |
| 3,442,569 | A | 5/1969 | Bonnet |
| 3,459,111 | A | 8/1969 | Cooper, Jr. |
| 3,503,315 | A | 3/1970 | Montebello |
| 3,530,779 | A | 9/1970 | Alofs |
| 3,584,369 | A | 6/1971 | Montebello |
| 3,607,273 | A | 9/1971 | Kinney |
| 3,613,539 | A | 10/1971 | Dudley |
| 3,671,122 | A | 6/1972 | Dudley |
| 3,676,130 | A | 7/1972 | Burckhardt et al. |
| 3,683,773 | A | 8/1972 | Dudley |
| 3,706,486 | A | 12/1972 | de Montebello |
| 3,751,258 | A | 8/1973 | Howe et al. |
| 3,801,183 | A | 4/1974 | Sevelin |
| 4,034,555 | A | 7/1977 | Rosenthal |
| 4,082,426 | A | 4/1978 | Brown |
| 4,099,838 | A | 7/1978 | Cook |
| 4,121,011 | A | 10/1978 | Glover et al. |
| 4,200,875 | A | 4/1980 | Galanos |
| 4,315,665 | A | 2/1982 | Haines |
| 4,367,920 | A | 1/1983 | Tung |
| 4,420,527 | A | 12/1983 | Conley |
| 4,424,990 | A | 1/1984 | White et al. |
| 4,541,727 | A | 9/1985 | Rosenthal |
| 4,541,830 | A | 9/1985 | Hotta et al. |
| 4,552,442 | A | 11/1985 | Street |
| 4,557,590 | A | 12/1985 | Winnek |
| 4,618,552 | A | 10/1986 | Tanaka et al. |
| 4,621,898 | A | 11/1986 | Cohen |
| 4,629,667 | A | 12/1986 | Kistner et al. |
| 4,632,895 | A | 12/1986 | Patel et al. |
| 4,634,220 | A | 1/1987 | Hockert et al. |
| 4,650,283 | A | 3/1987 | Orensteen et al. |
| 4,668,063 | A | 5/1987 | Street |
| 4,688,894 | A | 8/1987 | Hockert |
| 4,691,993 | A | 9/1987 | Porter et al. |
| 4,694,993 | A | 9/1987 | Endo et al. |
| 4,700,207 | A | 10/1987 | Vanier |
| 4,708,920 | A | 11/1987 | Orensteen et al. |
| 4,714,656 | A | 12/1987 | Bradshaw et al. |
| 4,732,453 | A | 3/1988 | de Montebello et al. |
| 4,743,526 | A | 5/1988 | Ando et al. |
| 4,757,350 | A | 7/1988 | Street |
| 4,765,656 | A | 8/1988 | Becker et al. |
| 4,772,582 | A | 9/1988 | DeBoer |
| 4,775,219 | A | 10/1988 | Appeldorn et al. |
| 4,783,141 | A | 11/1988 | Baba et al. |
| 4,799,739 | A | 1/1989 | Newswanger |
| 4,833,124 | A | 5/1989 | Lum |
| 4,876,235 | A | 10/1989 | DeBoer |
| 4,892,336 | A | 1/1990 | Kaule et al. |
| 4,917,292 | A | 4/1990 | Drexler |
| 4,920,039 | A | 4/1990 | Fotland et al. |
| 4,927,238 | A | 5/1990 | Green et al. |
| 4,935,335 | A | 6/1990 | Fotland |
| 5,064,272 | A | 11/1991 | Bailey et al. |
| 5,091,483 | A | 2/1992 | Mazurek et al. |
| 5,105,206 | A | 4/1992 | Sarraf et al. |
| 5,169,707 | A | 12/1992 | Faykish et al. |
| 5,204,160 | A | 4/1993 | Rouser |
| 5,244,288 | A | 9/1993 | Nagaoka et al. |
| 5,254,390 | A | 10/1993 | Lu |
| 5,264,278 | A | 11/1993 | Mazurek et al. |
| 5,279,912 | A | 1/1994 | Telfer et al. |
| 5,308,737 | A | 5/1994 | Bills et al. |
| 5,326,619 | A | 7/1994 | Dower et al. |
| 5,330,799 | A | 7/1994 | Sandor et al. |
| 5,355,188 | A | 10/1994 | Biles |
| 5,359,454 | A | 10/1994 | Steenblik et al. |
| 5,360,694 | A | 11/1994 | Thien et al. |
| 5,364,740 | A | 11/1994 | Fohrenkamm et al. |
| 5,449,200 | A | 9/1995 | Andric |
| 5,449,597 | A | 9/1995 | Sawyer |
| 5,455,689 | A | 10/1995 | Taylor et al. |
| 5,459,016 | A | 10/1995 | Debe et al. |
| 5,491,045 | A | 2/1996 | DeBoer et al. |
| 5,506,300 | A | 4/1996 | Ward et al. |
| 5,514,730 | A | 5/1996 | Mazurek et al. |
| 5,521,035 | A | 5/1996 | Wolk et al. |
| 5,554,432 | A | 9/1996 | Sandor et al. |
| 5,589,246 | A | 12/1996 | Calhoun et al. |
| 5,594,841 | A | 1/1997 | Schutz |
| 5,639,580 | A | 6/1997 | Morton |
| 5,642,226 | A | 6/1997 | Rosenthal |
| 5,644,431 | A | 7/1997 | Magee |
| 5,671,089 | A | 9/1997 | Allio |
| 5,680,171 | A | 10/1997 | Lo et al. |
| 5,681,676 | A | 10/1997 | Telfer et al. |
| 5,685,939 | A | 11/1997 | Wolk et al. |
| 5,689,372 | A | 11/1997 | Morton |
| 5,706,133 | A | 1/1998 | Orensteen et al. |
| 5,712,731 | A | 1/1998 | Drinkwater et al. |
| 5,717,844 | A | 2/1998 | Lo et al. |
| 5,744,291 | A | 4/1998 | Ip |
| 5,757,550 | A | 5/1998 | Gulick, Jr. |
| 5,828,488 | A | 10/1998 | Ouderkirk et al. |
| 5,843,617 | A | 12/1998 | Patel et al. |
| 5,850,278 | A | 12/1998 | Lo et al. |
| 5,850,580 | A | 12/1998 | Taguchi et al. |
| 5,856,061 | A | 1/1999 | Patel et al. |
| 5,877,895 | A | 3/1999 | Shaw et al. |
| 5,882,774 | A | 3/1999 | Jonza et al. |
| 5,889,118 | A | 3/1999 | Delgado |
| 5,894,069 | A | 4/1999 | Wen et al. |
| 5,896,230 | A | 4/1999 | Goggins |
| 5,935,758 | A | 8/1999 | Patel et al. |
| 5,945,249 | A | 8/1999 | Patel et al. |
| 5,986,781 | A | 11/1999 | Long |
| 5,994,026 | A | 11/1999 | DeBoer et al. |
| 6,028,621 | A | 2/2000 | Yakubovich |
| 6,057,067 | A | 5/2000 | Isberg et al. |
| 6,069,680 | A | 5/2000 | Kessler |
| 6,084,713 | A | 7/2000 | Rosenthal |
| 6,092,465 | A | 7/2000 | Agronin |
| 6,095,566 | A | 8/2000 | Yamamoto et al. |
| 6,110,645 | A | 8/2000 | DeBoer et al. |
| 6,171,766 | B1 | 1/2001 | Patel |
| 6,177,217 | B1 | 1/2001 | Agostinelli et al. |
| 6,197,474 | B1 | 3/2001 | Niemeyer et al. |
| 6,212,805 | B1 | 4/2001 | Hill |
| 6,222,650 | B1 | 4/2001 | Long |
| 6,228,555 | B1 | 5/2001 | Hoffend, Jr. |
| 6,242,152 | B1 | 6/2001 | Staral et al. |
| 6,286,873 | B1 | 9/2001 | Seder |
| 6,288,842 | B1 | 9/2001 | Florczak et al. |
| 6,291,143 | B1 | 9/2001 | Patel et al. |
| 6,310,733 | B1 | 10/2001 | Dolgoff |
| 6,351,537 | B1 | 2/2002 | Dovgodko |
| 6,369,844 | B1 | 4/2002 | Neumann et al. |
| 6,388,043 | B1 | 5/2002 | Langer et al. |
| 6,398,270 | B1 | 6/2002 | Fukui et al. |
| 6,468,715 | B2 | 10/2002 | Hoffend, Jr. |
| 6,531,230 | B1 | 3/2003 | Weber et al. |
| 6,535,338 | B2 | 3/2003 | Nishikawa |
| 6,552,830 | B2 | 4/2003 | Long |
| 6,589,376 | B1 | 7/2003 | Davis |
| 6,602,578 | B1 | 8/2003 | Tompkin |
| 6,729,655 | B1 | 5/2004 | Dorricott |
| 6,750,988 | B1 | 6/2004 | Ghislain Bossut |
| 6,781,733 | B1 | 8/2004 | Hira |
| 6,791,723 | B1 | 9/2004 | Vallmajo et al. |
| 6,846,776 | B2 | 1/2005 | Tutt |
| 6,919,892 | B1 | 7/2005 | Cheiky et al. |
| 7,016,116 | B2 | 3/2006 | Dolgoff |
| 7,046,447 | B2 | 5/2006 | Raber |
| 7,054,042 | B2 | 5/2006 | Holmes |
| 7,068,434 | B2 | 6/2006 | Florczak et al. |
| 7,106,519 | B2 | 9/2006 | Aizenberg |
| 7,154,674 | B2 | 12/2006 | Nellissen |
| 7,196,822 | B2 | 3/2007 | Hu |
| 7,246,824 | B2 | 7/2007 | Hudson |
| 7,253,958 | B2 | 8/2007 | Aizenberg et al. |
| 7,255,909 | B2 | 8/2007 | Mann |

| | | |
|---|---|---|
| 7,265,904 B2 | 9/2007 | Schilling |
| 7,333,268 B2 | 2/2008 | Steenblik |
| 7,336,422 B2 | 2/2008 | Dunn et al. |
| 7,358,513 B2 | 4/2008 | Ryzi |
| 7,374,799 B2 | 5/2008 | Hanamura |
| 7,435,979 B2 | 10/2008 | Ryzi |
| 7,468,842 B2 | 12/2008 | Steenblik |
| 7,480,099 B2 | 1/2009 | Raber |
| 7,586,685 B2 | 9/2009 | Dunn et al. |
| 7,609,452 B2 | 10/2009 | Zabiega |
| 7,648,744 B2 | 1/2010 | Kuo |
| 7,649,689 B2 | 1/2010 | Castello |
| 7,658,980 B2 | 2/2010 | Kuo |
| 7,710,551 B2 | 5/2010 | Hersch |
| 7,729,562 B2 | 6/2010 | Ra |
| 7,738,175 B2 | 6/2010 | Steenblik |
| 7,751,608 B2 | 7/2010 | Hersch |
| 7,800,825 B2 | 9/2010 | Brooks et al. |
| 7,830,627 B2 | 11/2010 | Commander |
| 7,951,319 B2 | 5/2011 | Sherman et al. |
| 7,981,499 B2 | 7/2011 | Endle et al. |
| 7,997,625 B2 | 8/2011 | Dean |
| 8,003,197 B2 | 8/2011 | Yukawa |
| 8,009,360 B2 | 8/2011 | Steenblik |
| 8,027,093 B2 | 9/2011 | Commander |
| 8,057,980 B2 | 11/2011 | Dunn |
| 8,077,393 B2 | 12/2011 | Steenblik |
| 8,111,352 B2 | 2/2012 | Stalder |
| 8,111,462 B2 | 2/2012 | Steenblik |
| 8,120,855 B2 | 2/2012 | Steenblik |
| 8,254,030 B2 | 8/2012 | Steenblik |
| 2003/0116630 A1 | 6/2003 | Carey et al. |
| 2003/0117262 A1 | 6/2003 | Anderegg |
| 2005/0142468 A1 | 6/2005 | Blood |
| 2007/0278194 A1 | 12/2007 | Hoelsher |
| 2008/0027199 A1 | 1/2008 | Mazurek et al. |
| 2008/0130126 A1* | 6/2008 | Brooks et al. ............... 359/619 |
| 2012/0058305 A1 | 3/2012 | Mazurek |

FOREIGN PATENT DOCUMENTS

| | | |
|---|---|---|
| DE | 198 04 997 C1 | 2/1999 |
| EP | 0 175 504 | 3/1986 |
| EP | 0 203 752 B1 | 5/1986 |
| EP | 0 363 919 | 1/1990 |
| EP | 0 404 004 | 12/1990 |
| EP | 0 583 766 | 2/1994 |
| EP | 0 658 443 | 6/1995 |
| EP | 0 673 785 | 9/1995 |
| EP | 0 743 552 | 11/1996 |
| EP | 0 688 351 | 8/1997 |
| EP | 0 655 347 | 9/1997 |
| EP | 0 615 860 | 8/1998 |
| EP | 1 079 274 | 12/2004 |
| GB | 1 308 116 | 2/1973 |
| GB | 1 433 025 | 4/1976 |
| GB | 2 083 726 | 3/1982 |
| JP | 61-261701 | 11/1986 |
| JP | 01 065153 | 3/1989 |
| JP | 1-181083 | 12/1989 |
| JP | 03 068610 | 3/1991 |
| JP | 03 068611 | 3/1991 |
| JP | 4309583 | 11/1992 |
| JP | 5 188499 | 7/1993 |
| JP | 6-308895 | 11/1994 |
| JP | 7-140571 | 6/1995 |
| JP | 7-281327 | 10/1995 |
| JP | 9 253275 | 3/1996 |
| JP | 09-043752 | 2/1997 |
| JP | 10-186276 | 7/1998 |
| JP | 11-500236 | 1/1999 |
| JP | 2001-116917 | 4/2001 |
| WO | WO 83/03019 | 9/1983 |
| WO | WO 94/16392 | 7/1994 |
| WO | WO 95/26281 | 10/1995 |
| WO | WO 96/24867 | 8/1996 |
| WO | WO 97/15173 | 4/1997 |
| WO | WO 97/46631 | 12/1997 |
| WO | WO 99/37949 | 7/1999 |
| WO | WO 99/42147 | 8/1999 |
| WO | WO 01/63341 | 8/2001 |
| WO | WO 02/22376 A1 | 3/2002 |
| WO | WO 02/40291 | 5/2002 |
| WO | WO 03/022598 A1 | 3/2003 |
| WO | WO 03/061983 | 7/2003 |
| WO | WO 03/093341 | 11/2003 |
| WO | WO 03/993341 | 11/2003 |
| WO | WO 2005/052650 | 6/2005 |
| WO | WO 2005/106601 | 11/2005 |

OTHER PUBLICATIONS

Weekly Reports of the Meetings of the Academy of Science published, in accordance with an academy decision dated Jul. 13, 1835, vol. 146, Jan.-Jun. 1908, pp. 446-451.

3M Security Systems Division, 3M ™ Full Page Reader Product Fact Sheet, 2004, 6 pages.

3M Security Systems Division, 3M ™ ePassport Reader Product Fact Sheet, 2004, 6 pages.

3M Security Systems Division, 3M ™ Inspection Reader Product Fact Sheet, 2004, 2 pages.

3M Security Systems Division, 3M ™ Authentication Reader Product Fact Sheet, 2004, 4 pages.

Yu. A. Dudknikov, B.K. Rozhkov, and E.N. Antipova, "Obtaining a Portrait of a Person by the Integral Photography Method," Dec. 20, 1979, pp. 562-563, Sov. J. Opt. Technol. 47(9), Sep. 1980, © 1981 The Optical Society of America.

Yu. A. Dudknikov and B.K. Rozhkov, "Selecting the Parameters of the Lens-Array Photgraphing System in Integral Photograpy," Feb. 24, 1977, pp. 349-351, Sov. J. Opt. Technol. 45(6), Jun. 1978, © 1979 The Optical Society of America.

Yu. A. Dudknikov, B.K. Rozhkov, "Raster 3D Imaging Systems", Leningrad, Maschinostroeniye, Ch. 4, pp. 102-173; Sections 5.5-5.9, pp. 190-209, Nov. 1986.

Kim et al., "Polyurethanes having shape memory effects", *Polymer*, vol. 37 No. 26, pp. 5781-5793, 1996.

Lendlein et al., "AB-polymer networks based on oligo($\epsilon$-caprolactone) segments showing shape-memory properties", *PNAS*, vol. 98 No. 3, pp. 842-847, 2001.

Lendlein and Kelch, "Shape-memory polymers", *Angew. Chem. Int. Ed.* 2002, 41, 2034-2057.

Lendlein and Langer, "Biodegradable, elastic shape-memory polymers for potential biomedical applications", *Science*, vol. 296, pp. 1673-1676, 2002.

Lendlein et al., "Shape-Memory Polymers as Stimuli-Sensitive Implant Materials," Clinical Hemorheology and Microcirculation, IOS Press, Amsterdam, NL, vol. 32, No. 2, Jan. 1, 2005, pp. 105-116.

Mazurek et al., "Novel materials based on silicone-acrylate copolymer networks", *Journal of Applied Polymer Science*, vol. 80, pp. 159-180, 2001.

Factiva WireWatch Message, "Shape-memory polymers offer new twist on applications", *Modern Plastics International, Chemical Business NewsBase*, Apr. 24, 2003.

* cited by examiner

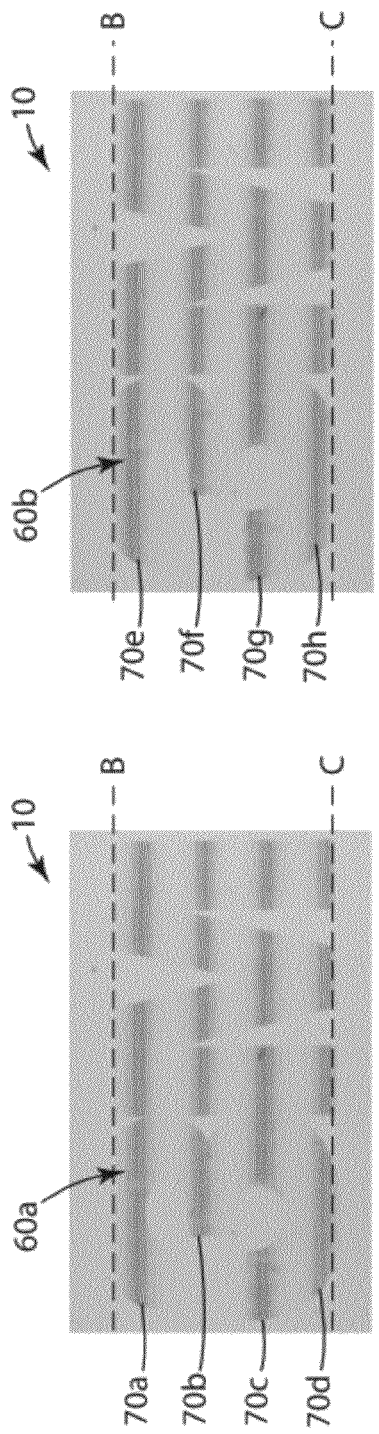
FIG. 18A
FIG. 18B
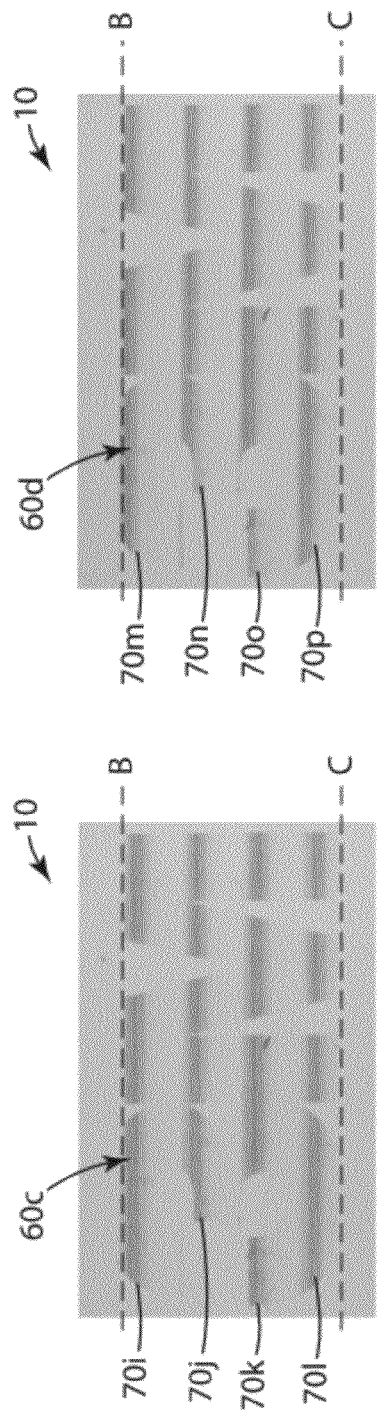
FIG. 18C
FIG. 18D

METHODS OF FORMING SHEETING WITH COMPOSITE IMAGES THAT FLOAT AND SHEETING WITH COMPOSITE IMAGES THAT FLOAT

CROSS-REFERENCE TO RELATED APPLICATIONS

This application is a continuation of U.S. patent application Ser. No. 12/257,182, filed Oct. 23, 2008, now U.S. Pat. No. 8,111,463 now allowed, the disclosure of which is incorporated by reference in its entirety herein.

FIELD OF THE INVENTION

The present invention relates to methods of forming images on sheeting that provide at least two composite images, at least one of which is perceived by an observer to be suspended in space relative to the sheeting, and in which at least one of the composite images is viewable to the unaided eye and the other composite image is viewable to the aided eye. The present invention also relates to sheeting that provides at least two composite images, at least one of which is perceived by an observer to be suspended in space relative to the sheeting, and in which at least one of the composite image is viewable to the unaided eye and the other composite images is viewable to the aided eye.

BACKGROUND OF THE INVENTION

A number of security features have been developed to help authenticate a document of value or article of value, thus assisting in preventing counterfeiters from altering, duplicating or simulating a document of value or article of value. Some of these security features may include "overt" security features or "covert" security features. Overt security features are features that are easily viewable to the unaided eye, such features may include holograms and other diffractive optically variable images, embossed images, and color-shifting films and color shifting inks An unaided eye may be corrected to normal vision, but is not otherwise assisted by, for example, magnification or a special viewer. In contrast, covert security features include images only visible under certain conditions where the eye is aided, such as inspection under magnification, under specific wavelengths of light or a special viewer.

Sheeting materials having a graphic image or other mark have been widely used, particularly as labels for authenticating an article or document. For example, sheetings such as those described in U.S. Pat. Nos. 3,154,872; 3,801,183; 4,082,426; and 4,099,838 have been used as validation stickers for vehicle license plates, and as security films for driver's licenses, government documents, tape cassettes, playing cards, beverage containers, and the like. Other uses include graphics applications for identification purposes such as on police, fire or other emergency vehicles, in advertising and promotional displays and as distinctive labels to provide brand enhancement.

Another form of imaged sheeting is disclosed in U.S. Pat. No. 6,288,842 (Florczak et al.). Florczak et al. discloses microlens sheeting with composite images, in which the composite image floats above or below the sheeting, or both. The composite image may be two-dimensional or three-dimensional. Methods for providing such sheeting, including by the application of radiation to a radiation sensitive material layer adjacent the microlenses, are also disclosed. This patent discloses that images are created as a result of a compositional change, a removal or ablation of the material, a phase change, or a polymerization of the coating disposed adjacent to one side of the microlens layer or layers.

PCT Patent Application Publication, WO 2007/047259, "Methods of Forming Sheeting with a Composite Image that Floats and Sheeting with a Composite Image that Floats," (Endle et al.) discloses methods of forming images on sheeting that provide one or more composite images that are perceived by an observer to be suspended in space relative to the sheeting, and in which the perspective of the composite image changes with the viewing angle. The disclosure also relates to sheeting that provides one or more composite images that are perceived by an observer to be suspended in space relative to the sheeting, and in which the perspective of the composite image changes with the viewing angle.

U.S. Pat. No. 7,333,268 (Steenblik et al.) discloses a film material utilizing a regular two-dimensional array of non-cylindrical lenses to enlarge micro-images, called icons to form a synthetically magnified image through the united performance of a multiplicity of individual lens/icon image systems.

U.S. Pat. Nos. 6,222,650 B1 and 6,552,830 B2, "Holographic Authentication Element and Document Having Holographic Authentication Element Formed Thereon", (Long) discloses methods and compositions with non-diffractive micro-graphical features embedded in a surround of diffractive structure, such as a diffraction grating or holographic structure. The patent depends on diffractive or holographic methods and structures to form high resolution text.

SUMMARY OF THE INVENTION

One aspect of the present invention provides a sheeting. In one embodiment of the sheeting, the sheeting comprises: an array of microlenses; a material layer adjacent the array of microlenses; a first donor material in contact with the material layer, wherein the donor material forms at least two individual, partially complete images on the material layer associated with each of a plurality of the microlenses; a first composite image, provided by at least one of the individual images, that appears to the unaided eye to float above or below the sheeting, or both; a second composite image, provided by at least one of the individual images, that appears to the aided eye to float above, in, or below the sheeting, or any combination thereof, wherein the second composite image is aligned with the first composite image.

Another aspect of the present invention provides a method of forming two composite images on a microlens sheeting. In one embodiment of this method, the method comprises the steps of: providing a sheeting having an array of microlenses and a material layer adjacent the array of microlenses; providing a mask adjacent the array of microlenses of the sheeting; providing a first donor substrate adjacent the material layer of the sheeting, wherein the first donor substrate is radiation sensitive; providing a radiation source; transferring at least a portion of the first donor substrate to the sheeting using the radiation source and the mask to form at least two individual, partially complete images on the material layer associated with each of a plurality of the microlenses, whereby the sheeting exhibits a first composite image, provided by at least one of the individual images, that appears to the unaided eye to float above or below the sheeting, or any combination thereof, wherein the sheeting exhibits a second composite image, provided by at least one of the individual images, that appears to the aided eye to float above, in, or below the sheeting, or any combination thereof, wherein the second composite image is aligned with the first composite image.

In another embodiment of this method, the method comprises the steps of: providing a sheeting having an array of microlenses and a material layer adjacent the array of microlenses; providing a first donor substrate adjacent the material layer of the sheeting, wherein the first donor substrate is radiation sensitive; providing a radiation source; transferring at least a portion of the first donor substrate to the sheeting using the radiation source to form individual, partially complete images on the material layer associated with each of a plurality of the microlenses, whereby the sheeting exhibits a first composite image, provided by the individual images, that appears to the unaided eye to float above or below the sheeting, or any combination thereof; thereafter removing selected portions of the individual, partially complete images using the radiation source to form a second composite image, provided by the individual images, that appears to the aided eye to float above, in, or below the sheeting, or any combination thereof.

Another aspect of the present invention provides another sheeting. In this particular embodiment, the sheeting comprises: an array of microlenses; a material layer adjacent the array of microlenses; a first donor material in contact with the material layer, wherein the donor material forms at least two individual, partially complete images formed on the material layer associated with each of a plurality of the microlenses; a first composite image, provided by at least one of the individual images, that appears to the unaided eye to float above or below the sheeting, or any combination thereof a second composite image, provided by at least one of the individual images, that appears to the aided eye to float above, in, or below the sheeting, or any combination thereof, wherein the at least one of the individual, partially complete images includes a gaseous void.

BRIEF DESCRIPTION OF THE DRAWINGS

The invention will be described herein with reference to the appended drawings, in which:

FIGS. 18A-D are photomicrographs of a composite image that is an angularly variable array of images, where each photomicrograph illustrates a different viewing position relative to the sheeting;

FIG. 29 is a schematic representation of a sheeting having a second composite image that appears to float in the inventive sheeting when the sheeting is viewed in reflected light;

DETAILED DESCRIPTION OF THE INVENTION

Figure 1:
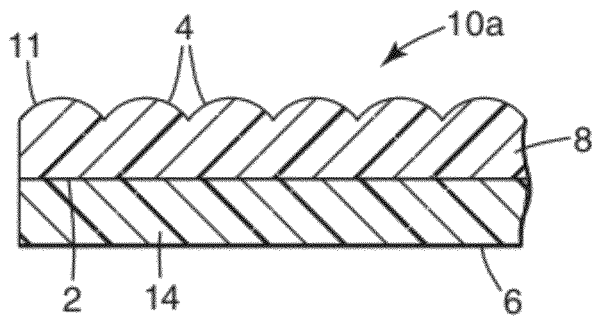
FIG. 1 is an enlarged cross sectional view of one embodiment of a microlens sheeting comprising a plano-convex base sheet.

The microlens sheeting of the present invention and the method of imaging the same produces two types of composite images, which are provided by individual partially complete images and/or individual complete images associated with a number of the microlenses. These composite images appear to be suspended, or to float above, in the plane of, and/or below the sheeting, or any combination thereof. These suspended images are referred to for convenience as floating images, and they can be located above or below the sheeting (either as two or three-dimensional images), or can be a three-dimensional image that appears above, in the plane of, and below the sheeting. The first type of floating composite image is observed by a viewer with an unaided eye. An unaided eye may be corrected to normal vision, but is not otherwise assisted by, for example, magnification or a special viewer. The second type of floating composite image is not viewable with an unaided eye, but instead is observed by a viewer with an aided eye, for example under magnification. Another way to describe the first type of floating composite image is overt images. Another way to describe the second type of floating image is covert images. (Covert and overt features are described generally in the Background section.) Both types of images can be in black and white or in color, and can appear to move in the same or opposite direction as the observer. Unlike some holographic sheetings, imaged sheeting of the present invention cannot be used to create a replica of itself.

The sheeting, imaged by the methods of the present invention, has composite images as described, which may be used in a variety of applications such as securing tamperproof images in passports, ID badges, event passes, affinity cards, product identification formats, currency, and advertising promotions for verification and authenticity, brand enhancement images which provide a floating or sinking or a floating and sinking image of the brand, identification presentation images in graphics applications such as emblems for police, fire or other emergency vehicles; information presentation images in graphics applications such as kiosks, night signs and automotive dashboard displays; and novelty enhancement through the use of composite images on products such as business cards, hang-tags, art, shoes and bottled products.

The present invention further provides different embodiments of inventive methods of forming imaged sheeting containing the described composite images. In one embodiment, a mask and donor sheet are used to simultaneously create both the first type and second type of composite images. In another embodiment, a donor sheet is used to create the first type of composite images, and thereafter a method of removing certain portions of the first type of composite images is used to form the second type of composite images.

U.S. Pat. No. 6,288,842 (Florczak et al.) discloses that floating images on microlens sheeting are created as a result of a compositional change, a removal or ablation of the material, a phase change, or a polymerization of the coating disposed adjacent to one side of the microlens layer or layers. PCT Patent Application Publication, WO 2007/047259 (Endle et al.) discloses the creation of floating images on microlens sheeting by the addition of material onto the microlens sheeting. In contrast to the disclosure in these two references, in one embodiment, a present inventive method creates the first type and second type of floating images referred to above by the addition of the material on the microlens sheeting using a mask. In another embodiment, a present inventive method creates the first type and second type of floating images referred to above by the addition of the material on the microlens sheeting and subsequent removing of such material in particular sections.

Figure 2:
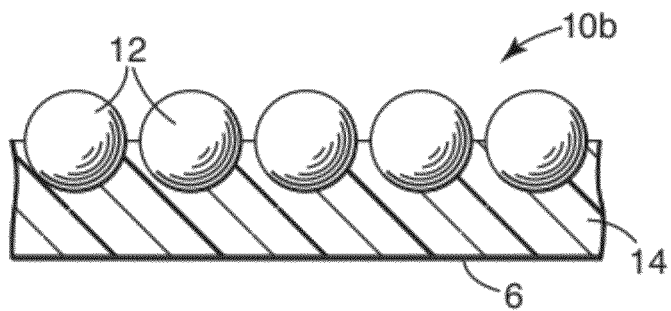
FIG. 2 is an enlarged cross sectional view of one embodiment of an "exposed lens" microlens sheeting.

Microlens sheeting on which the images of this invention can be formed comprise one or more discrete layers of microlenses with a layer of material adjacent to one side of the microlens layer or layers. For example, FIG. 1 illustrates one embodiment of a suitable type of microlens sheeting 10a. This sheeting comprises a transparent base sheet 8 having first and second broad faces, the second face 2 being substantially planer and the first face 11 having an array of substantially spherical or aspherical microlenses 4. A layer of material 14 is optionally provided on the second face 2 of the base sheet 8. The layer of material 14 includes a first side 6 for receiving donor material as described in more detail below. FIG. 2 illustrates another embodiment of a suitable type of microlens sheeting 10b. The shape of the microlenses and thickness of the base sheet and their variability are selected such that light appropriate for viewing the sheeting is focused approximately at the first face 6. In this embodiment, the microlens sheeting is an "exposed lens" type of microlens sheeting 10b that includes a monolayer of transparent microspheres 12 that are partially embedded in a material layer 14, which is also typically a bead binder layer, such as a polymeric material. The layer of material 14 includes a first side 6 for receiving donor material as described in more detail below. The microspheres 12 are transparent both to the wavelengths of radiation that may be used to image the donor substrate material (explained in more detail below), as well as to the wavelengths of light in which the composite image will be viewed. This type of sheeting is described in greater detail in U.S. Pat. No. 3,801,183, except where the bead bond layer is very thin, for instance, to the extent where the bead bond layer is only between the beads, or occupying the interstitial spaces between the beads. Alternatively, this type of sheeting can be made by using microspheres of an appropriate optical index for focusing radiation approximately on the first side 6 of the layer of material 14 when the bead bond is of the thickness taught in U.S. Pat. No. 3,801,183. Such microspheres include polymethyl methylacrylate beads, which are commercially available from Esprix Technologies based in Sarasota, Fla.

Figure 3:
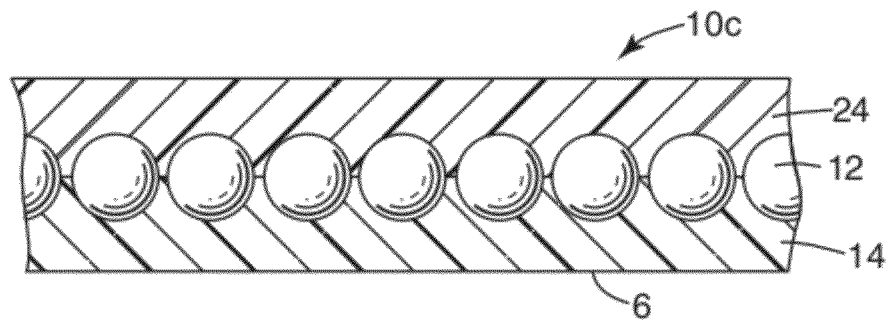
FIG. 3 is an enlarged cross sectional view of one embodiment of an "embedded lens" microlens sheeting.

FIG. 3 illustrates another embodiment of a suitable type of microlens sheeting 10c. In this embodiment, the microlens sheeting is an "embedded-lens" type of sheeting 10c in which the microsphere 12 are embedded between a transparent protective overcoat 24, which is typically a polymeric material, and a material layer 14, which is also typically a bead binder layer, such as a polymeric material. The layer of material 14 includes a first side 6 for receiving donor material as described in more detail below. This type of sheeting is described in greater detail in U.S. Pat. No. 3,801,183, except that the reflective layer and adhesive would be removed, and the spacing layer 14 is reformulated so as to be less conformal to the curvature of the microspheres.

The microlenses of the sheeting 10 preferably have image forming refractive elements in order for image formation (described in more detail below) to occur; this is generally provided by forming spherically or aspherically shaped features. Other useful materials that provide a gradient refractive index (GRIN) will not necessarily need a curved surface to refract light. The microlenses may have any symmetry, such as cylindrical or spherical, provided real images are formed by the refraction surfaces. The microlenses themselves can be of discrete form, such as round plano-convex lenslets, round double convex lenslets, Fresnel lenslets, diffractive lenslets, rods, microspheres, beads, or cylindrical lenslets. Materials from which the microlenses can be formed include glass, polymers, minerals, crystals, semiconductors and combinations of these and other materials. Non-discrete microlens elements may also be used. Thus, microlenses formed from a replication or embossing process (where the surface of the sheeting is altered in shape to produce a repetitive profile with imaging characteristics) can also be used.

Microlenses with a uniform refractive index of between 1.4 and 3.0 over the visible and infrared wavelengths are preferred and more preferably, between 1.4 and 2.5, although not required. The refractive power of the microlenses, whether the individual microlenses are discrete or replicated, and regardless of the material from which the microlenses are made, is preferably such that the light incident upon the optical elements will focus on or near the first side 6 of the material layer 14. In certain embodiments, the microlenses preferably form a demagnified real image at the appropriate position on that layer. The construction of the microlens sheeting provides the necessary focusing conditions so that energy incident upon the front surface of the microlens sheeting is approximately focused upon a separate donor layer that is preferably radiation sensitive, which is described in more detail below.

Microlenses with diameters ranging from 15 micrometers to 275 micrometers are preferable, though other sized microlenses may be used. Good composite image resolution can be obtained by using microlenses having diameters in the smaller end of the aforementioned range for composite images that are to appear to be spaced apart from the microlens layer by a relatively short distance, and by using larger microlenses for composite images that are to appear to be spaced apart from the microlens layer by larger distances. Other microlenses, such as plano-convex, spherical or aspherical microlenses having lenslet dimensions comparable to those indicated for the microlenses, can be expected to produce similar optical results. Cylindrical lenses having lenslet dimensions comparable to those indicated for the microlenses can be expected to produce similar optical results, although different or alternative imaging optics train may be required.

As noted above, a layer of material 14 in FIGS. 1, 2 and 3 may be provided adjacent to the microlenses in the microlens sheeting 10. Suitable materials for the material layer 14 in the sheeting 10 include silicone, polyester, polyurethane, polycarbonate, polypropylene, or any other polymer capable of being made into sheeting or being supported by the base sheet 8. In one embodiment, the sheeting 10 may include a microlens layer and a material layer that are made from different materials. For example, the microlens layer may include acrylates, and the material layer may include polyester. In other embodiments, the sheeting 10 may include a microlens layer and a material layer that are made from the same materials. For example, the microlens and material layer of the sheeting 10 may be made of silicone, polyester, polyurethane, polycarbonate, polypropylene, polymethylmethacrylate or any other polymer capable of being made into sheeting, and may be formed by methods of mechanical embossing, replication or molding.

As described in more detail in reference to FIGS. 4a-b and 5a-b below, in one embodiment of the present inventive method which incorporates a mask 80, individual, partially complete images are formed on the material layer 14 associated with a plurality of microlenses using a donor substrate material, which, when viewed by an observer in front of the microlenses under reflected or transmitted light, provides composite images that appear to be suspended, or float, above, in the plane of, and/or below the sheeting, or any combination thereof. The mask 80 is similar to photolithography masks, also called reticles. In one exemplary embodiment, the mask 80 generally consists of a base material, such as glass or polymer sheeting. A pattern is formed on this sheeting using a technique, such as printing or metallization, followed by photolithography and etching. The areas on this mask are mostly opaque except the imaging wavelength from the radiation source 30 to prevent the donor material 42 from transferring to the material layer 14.

In contrast, areas (portions) 82 are most transparent to the imaging wavelength to enable donor material 42 to transfer to the material layer 14. These opaque areas may consist of features that require an aid such as a magnifier to be observed.

Although other materials may be used, the preferred method for providing such images is to provide a radiation sensitive donor material, and to use radiation to transfer that donor material in a desired manner to provide the individual, partially complete images on the first side of the layer of material. This transfer process could include meltstick, sublimation, additive ablation (material transfer to a substrate by ablating a donor), diffusion and/or other physical material transfer processes.

Suitable radiation sensitive donor material substrates useful for this invention include substrates coated with colorants in a binder, with or without additional radiation sensitive materials. The donor materials could be provided in bulk form or in roll form. As used in reference to the present invention, donor substrate material is "radiation sensitive" if, upon exposure to a given level of radiation, a portion of the donor material exposed transfers or preferentially adheres to a different location. The individual, partially complete images (illustrated in FIGS. 7A-C, 9A and 14A) are created as a result of an at least partial or complete removal of the radiation sensitive donor substrate material or colorant material from the donor substrate and the subsequent transfer of the donor substrate material or colorant material to the material layer of the microlens sheeting 10, where the mask 80 and its areas (portions) 82 control where the transfer of the donor substrate material occurs on the material layer 14.

In one embodiment, the donor substrate includes colorants providing color within the visible spectrum, such as pigments, dyes, inks, or a combination of any or all of these to provide color composite floating images, such as those illustrated in FIGS. 8, 9B, 10, 11 and 12. The pigments or dyes may be phosphorescent or fluorescent. Alternatively, the colorants in the donor materials may also appear metallic. The color of the resulting floating image is generally similar to the color of the colorant in the donor substrate, a condition more likely if the transferred donor substrate components are thermally stable and only small chemical or compositional changes occur upon transfer. Further, the color of the resulting composite floating image may be the same as the color of the colorant in the donor substrate. In yet another embodiment, the donor substrates may include macroscopic patterns of different colorants, such as stripes or zones of different colors throughout the substrate, or multicolored substrates. In alternative embodiments, the donor substrate is not required to include colorants providing color in the visible spectrum, and instead, the resulting composite floating images would appear colorless. Such donor substrates could contain colorless fluorescing dyes or phosphorescent materials, creating composite images visible only during or after exposure to specific wavelengths, or in the case of phosphorescent materials, during and for a duration after exposure to the wavelengths. Alternatively, such donor substrates may contain colorless materials that may or may not have a refractive index different than the material layer 14. A composite image formed from such donor materials may be only slightly visible when viewed in ambient lighting as in FIG. 21; however, it may appear to shine brighter than the reflections off of the non-imaged area of surface 6 when viewed with light substantially perpendicular to surface 6, i.e. collimated light. All donor substrates may optionally include additives that increase the substrate sensitivity to imaging radiation and ultimately aid in the transfer of the material, or said substrates may include a reflective and/or absorbing layer underneath at least the colorant to increase absorption of the radiation.

Figure 4A:
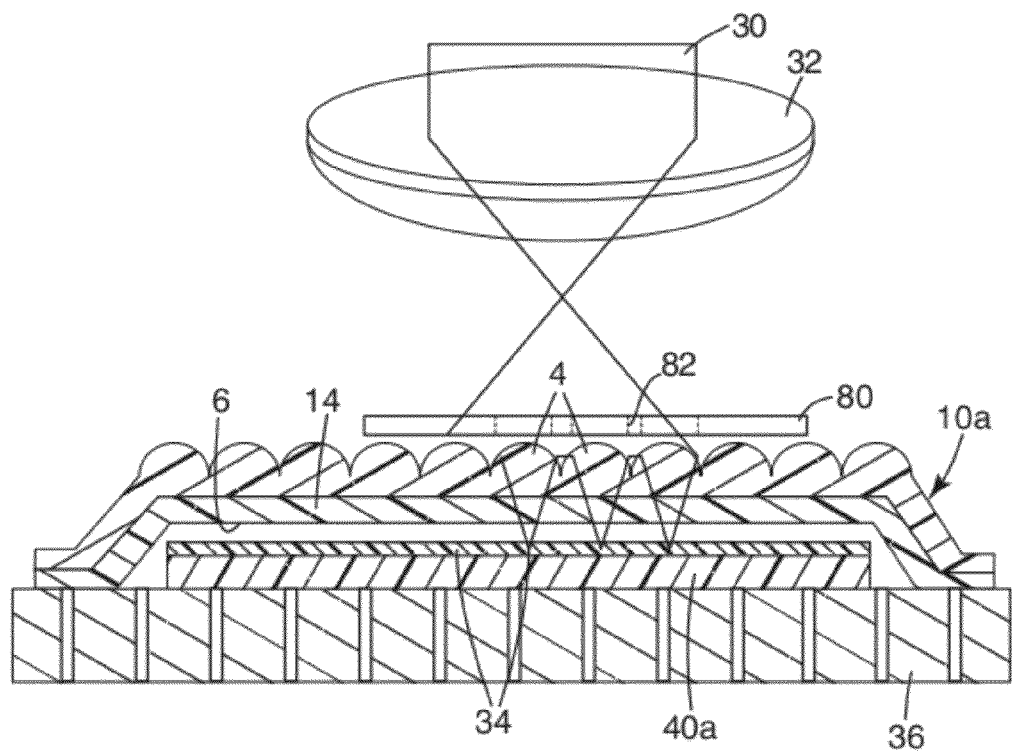
FIGS. 4a and 4b schematically illustrate one embodiment of the method in accordance with the present invention using a mask and a first donor sheet.

FIG. 4a schematically illustrates one embodiment of the method of forming a composite image on the microlens sheeting 10 in accordance with the present invention. The method includes using a radiation source 30. Any energy source providing radiation of the desired intensity and wavelength may be used as radiation source 30 with the method of the present invention. In one embodiment, radiation devices capable of providing radiation having a wavelength of between 200 nanometers and 11 micrometers are preferred, and more preferably, between 270 nanometers and 1.5 micrometers. Examples of high peak power radiation sources useful for this invention include passively Q-switched microchip lasers, and the family of Q-switched Neodymium doped lasers, and their frequency doubled, tripled, and quadrupled versions of any of these lasers, and Titanium doped-sapphire (abbreviated Ti:sapphire) lasers. Other examples of useful radiation sources include devices that give low peak power such as laser diodes, ion lasers, non Q-switched solid state lasers, metal vapor lasers, gas lasers, arc lamps and high power incandescent light sources.

For all useful radiation sources, the energy from the radiation source 30 is directed toward the microlens sheeting material 10 and controlled to give a highly divergent beam of energy. For energy sources in the ultraviolet, visible, and infrared portions of the electromagnetic spectrum, the light is controlled by appropriate optical elements, known to those skilled in the art. In one embodiment, a requirement of this arrangement of optical elements, commonly referred to as an optical train, is that the optical train direct light toward the sheeting material with appropriate divergence or spread so as to produce a "cone" of radiation irradiating the microlenses at the desired angles, thus irradiating the donor material aligned to said microlenses. The composite images of the present invention are preferably obtained by using radiation spreading devices with numerical apertures (defined as the sine of the half angle of the maximum diverging rays) of greater than or equal to 0.15, although smaller numerical aperture illumination may be used. Radiation spreading devices with larger numerical apertures produce composite images having a greater viewing angle, and a greater range of apparent movement of the image for the same float height. In alternative embodiments, the optical train may additionally contain elements to prevent radiation in an angular portion or portions of the cone of radiation. The resulting composite image(s) are only viewable over angles corresponding to the unblocked angular sections of the modified cone. Multiple composite images may be created at separate angular sections of the modified cone if desired. Using the modified cone and its inverse, one can produce a composite image that changes from one color to another as the sheeting 10 is tilted. Alternatively, multiple composite images can be produced in the same area causing the individual images to appear and disappear as the sheeting 10 is tilted.

Optical trains may be positioned other than normal to the microlens sheeting to produce the composite images of this invention. Further, the angle of the optical train to the microlens sheeting can be valued between imaging events, i.e., the optical train can be positioned at an angle, including normal to the sheeting, during a first transferring of donor material, and the angle of the optical train may remain at the first angle, or be changed to a new angle relative to the sheeting during a subsequent transferring of donor material step, or during removal of selected portions of individual, partially complete images.

FIG. 4a also schematically illustrates the use of a mask 80 in one embodiment of the method of forming composite images on the microlens sheeting 10 in accordance with the present invention. The mask 80 is useful for creating the two different types of composite images referenced above, where one type provides overt composite images and the other type provides covert composite images. The mask 80 has certain areas (portions) 82 transparent to the radiation source 30, allowing radiation to pass through the mask 80 to the microlens sheeting 10. Other sections of the mask 80, such as between areas (portions) 82, effectively block such radiation energy from the microlens sheeting 10. The material for mask 80 may be made of mylar or other plastic sheeting or glass. The pattern of transparent areas (portions) 82 in the mask 80 may be formed using silver halide photographic emulsion, metals (such as Cr, Al, Cu), or inks containing materials that absorb the radiation such as c-black. The pattern of transparent areas (portions) 82 can be formed by printing techniques, vacuum metallization followed by photolithography and etching or e-beam ablation, or photolithography of ultraviolet curable inks, and/or by other means known by those skilled in the art.

Figure 4B:
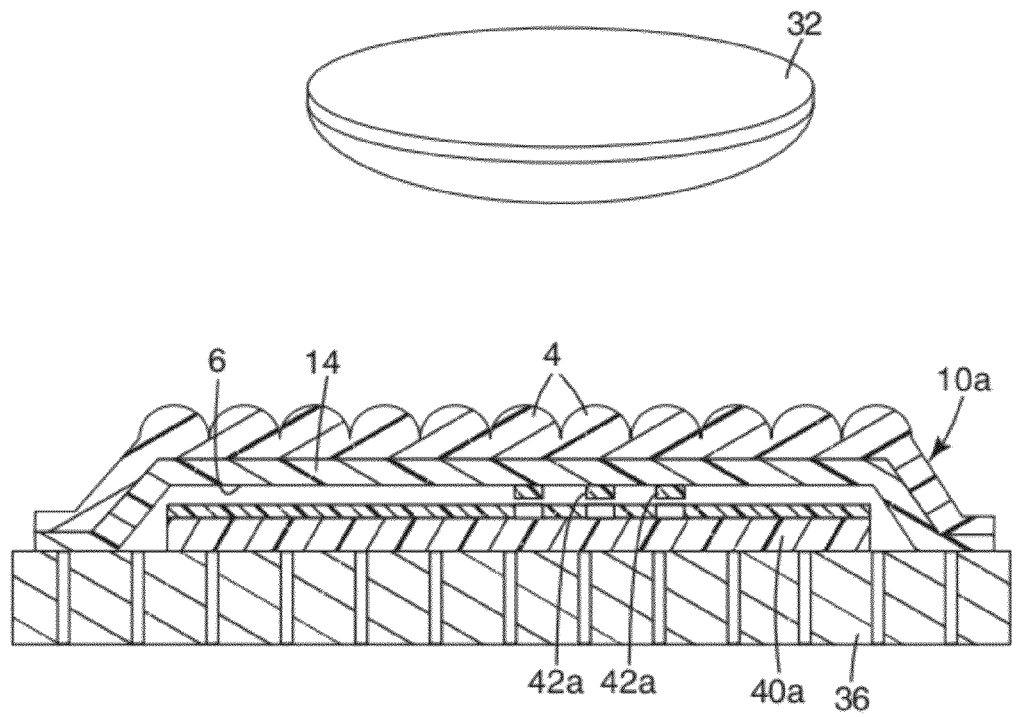

An exemplary imaging process according to the present invention includes the following steps, as illustrated in FIGS. 4a and 4b. FIG. 4a illustrates the imaging process by the radiation source, and FIG. 4b illustrates the resulting sheeting 10 after the imaging process. First, a microlens sheeting 10 is provided, such as the microlens sheeting 10a, 10b, 10c illustrated in FIGS. 1-3. FIG. 4a illustrates the use of microlens sheeting 10a, however, microlens sheeting 10b or 10c may be used in the process. Next, a first donor substrate 40*a* is provided, such as the donor substrates described above. Next, the microlens sheeting 10 is positioned adjacent or orientated next to the donor substrate 40*a*, such that the microlens sheeting 10 is between the radiation source 30 and the donor substrate 40*a*. In one embodiment, the microlens sheeting 10 and donor substrate 40*a* are in close proximity to each other, as illustrated in FIG. 4*a*. In another embodiment (not shown), the microlens sheeting 10 and donor substrate 40*a* are in contact with one another or pressed against each other, for instance by gravity, mechanical means, or pressure gradients produced by a vacuum chuck 36 and vacuum source (not shown). In yet another embodiment (not shown), microstructures may be between the microlens sheeting 10 and donor substrate 40*a* to provide a generally uniform gap or space between the microlens sheeting 10 and the donor substrate 40*a*. The microstructures may be independent microstructures that are positioned between the microlens sheeting and the donor substrate. Examples of such independent microstructures include polymethylmethacrylate spheres, polystyrene spheres, and silica spheres, all of which are commercially available from Esprix Technologies based in Sarasota, Fla. Alternatively, the microstructures may extend from either the donor substrate towards the microlens sheeting or from the first side of the layer of material in the sheeting. Examples of suitable donor substrates including such microstructures include Kodak™ Approval media and Matchprint Digital Halftone media, commercially available from Kodak Polychrome Graphics located in Norwalk, Conn. Suitable microlens sheeting including such microstructures are readily made, such as by replication, by those skilled in the art.

Next, the mask 80 is provided adjacent microlenses sheeting 10. In the illustrated embodiment, the mask 80 is adjacent the microlenses 4 of the sheeting 10 and the donor substrate 40*a* is adjacent the material layer 14 of the sheeting 10.

Next, the method includes the step of transferring portions of donor material from the first donor material substrate 40*a* to the first side 6 of the layer of material 14 of the sheeting 10 using mask 80 to form individual, partially complete images on the first side 6 of material layer 14, as illustrated in FIG. 4*b*. In one embodiment of the inventive method illustrated in FIGS. 4*a* and 4*b*, this transfer is obtained by directing collimated light from a radiation source 30 through a lens 32 toward the mask 80 and toward the microlens sheeting 10. The radiation source 30 is focused through the lens 32, transmitted through transparent areas (portions) 82 through the mask 80 and eventually through the microlens sheeting 10 and to the donor substrate 40*a*. The focal point 34 of the microlens 4 is approximately at the interface between the donor substrate 40*a* and the first side 6 of material layer 14 in the microlens sheeting 10 as illustrated in FIG. 4*a*. The donor material of substrate 40*a* absorbs incident radiation near the focal point 34 of the microlenses 4 on sheeting 10*a*. The absorption of the radiation induces the donor material of donor substrate 40*a* to transfer to the first side 6 of material layer 14 on sheeting 10*a* creating image pixels of donor material 42*a* that comprise the partially complete images corresponding to microlenses 4 of sheeting 10*a*, as illustrated in FIG. 4*b*. In alternative embodiments of this process where the first side 6 of material layer 14 on sheeting 10*a* is in close proximity to the donor material 40*a* or adhered to the donor material 40*a*, transfer mechanisms such as radiation-induced diffusion and preferential adhesion (melt-stick process) producing image pixels of donor material 42*a* that comprise the partially complete images corresponding to microlenses 4 of sheeting 10*a* are also possible. The transferred donor material 42*a* may have experienced a change in its chemical composition or component concentrations. These individual, partially complete images made from the donor material 42*a* together provide the composite floating images, which appear either to the unaided eye or aided eye to float above or below the sheeting 10 or both, as described further below.

Because each individual microlens 4 occupies a unique position relative to the optical axis, the radiation impinging on each microlens 4 will have a unique angle of incidence relative to the radiation incident on each other microlens. Thus, the light will be transmitted by each microlens 4 to a unique position on the donor substrate 40*a* close to focal point 34, and produces a unique image pixel of a partially complete image of donor materials 42*a* on the first side 6 of the layer of material 14 corresponding to each microlens 4, except where the radiation is blocked by mask 80, as described above. More precisely, a single light pulse produces only a single imaged portion of donor material 42*a* behind each properly exposed microlens 4, so to provide a partially complete image adjacent each microlens on the first side 6 of the material layer 14 of the sheeting 10. Multiple radiation pulses, or a quickly traversing, continuously illuminating, radiation beam may be used to create the image. For each pulse, the focal point of lens 32 is located at a new position relative to the position of the focal point 34 during the previous pulse relative to the microlensed sheeting. These successive changes in the position of the focal point 34 of the lens 32 relative to the microlenses 4 results in a corresponding change in the angle of incidence upon each microlenses 4, and accordingly, in the position of the imaged pixel of the partially complete image of donor material 42*a* created on the material layer 14 of the sheeting 10 with the donor material 42 by that pulse. As a result, the radiation incident on the donor substrate 40*a* near focal point 34 causes transfer of a selected pattern of the radiation sensitive donor material 42*a*. Because the position of each microlenses 4 is unique relative to every optical axis, the partially complete image formed by the transferred radiation sensitive donor material 42*a* for each microlens will be different from the image associated with every other microlens, because each microlens "sees" the incoming radiation from a different position. Thus, a unique image is formed associated with each microlens with the donor material 42*a* from the donor substrate on the material layer 14.

Another method for forming floating composite images uses a divergence creating target, such as a lens array (not illustrated) placed between the mask 80 and lens 32 to produce the highly divergent light to image the microlensed material. For example, the lens array could consist of multiple small lenses all with high numerical apertures arranged in a planar geometry. This lens array may be similar to or identical to the lens sheeting 80. It may also contain larger or smaller lenses with higher or lower packing density. When the array is illuminated by a radiation source, the array will produce multiple cones of highly divergent light, each individual cone being centered upon its corresponding lens in the array. The physical dimensions of the array are chosen to accommodate the largest lateral size of a composite image. By virtue of the size of the array, the individual cones of energy formed by the lenslets will expose the microlensed material as if an individual lens was positioned sequentially at all points of the array while receiving pulses of light. The selection of which lenses receive the incident light may occur by the use of a second reflective or absorbing mask placed in the laser path 30 above the lens array producing divergent light and above the mask 80 (if in use) allowing radiation to transmit only where the first composite floating image(s) is desired. This will also work if the mask is placed directly below the lens. A separate mask 80 may be used to form a second composite image. A diffractive pattern generator may also be used. The virtual image may also be formed by individually illuminating specific locations of the target with a low numerical aperture radiation beam.

Due to the lateral extent of the lens array, it may not be necessary to use multiple light pulses to trace out the image. By having the second mask 80 fully illuminated by the incident energy, the portions of the mask that allow energy to pass through will form many individual cones of highly divergent light outlining the floating image as if the image was traced out by a single lens 32. As a result, only a single light pulse is needed to form the entire composite image in the microlens sheeting. Alternatively, in place of a reflective mask, a beam positioning system, such as a galvanometric xy scanner, can be used to locally illuminate the lens array and trace the composite image on the array. Since the energy is spatially localized with this technique, only a few lenslets in the array are illuminated at any given time. Those lenslets that are illuminated will provide the cones of highly diverging light needed to expose the microlensed material to form the composite image in the sheetings. Alternatively, a beam positioning system such as a galvanometric xy scanner having an appropriate scan lens may be used to form the composite images.

Figure 5A:
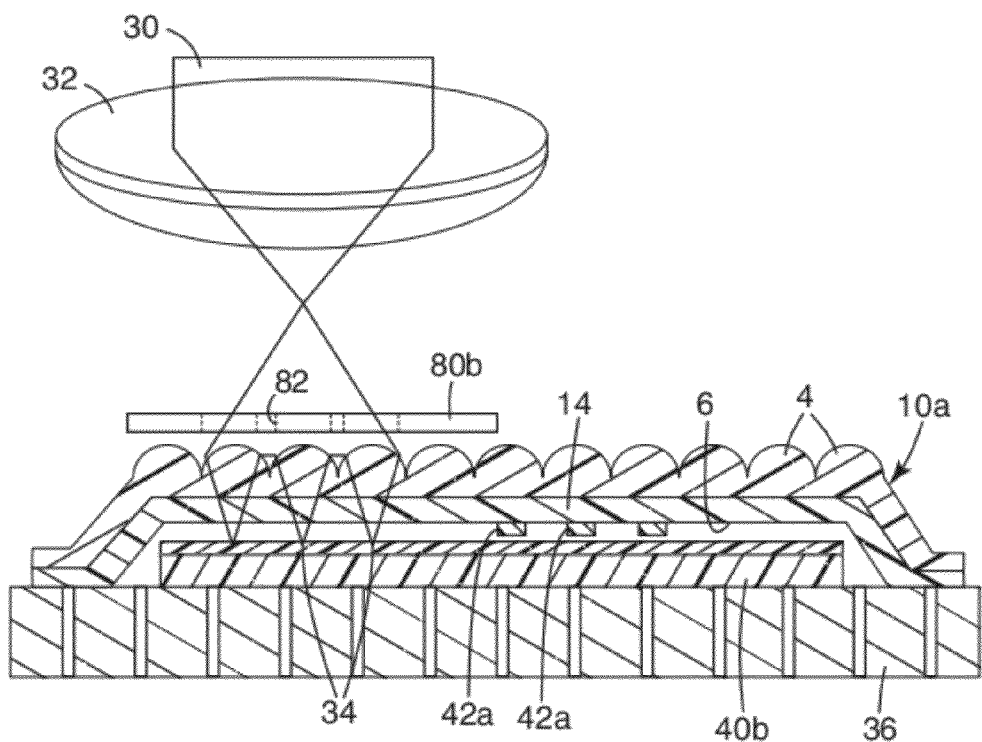
FIGS. 5a and 5b schematically illustrate another embodiment of the method illustrated in FIG. 4, except using a mask and a second donor sheet.
Figure 5B:
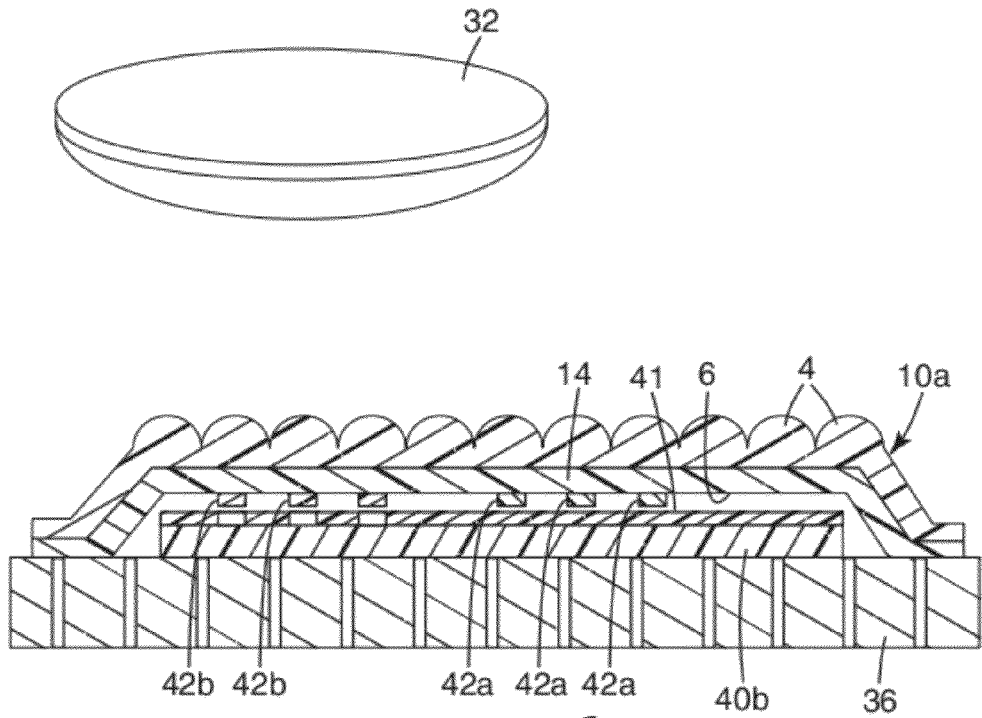
Figure 8:
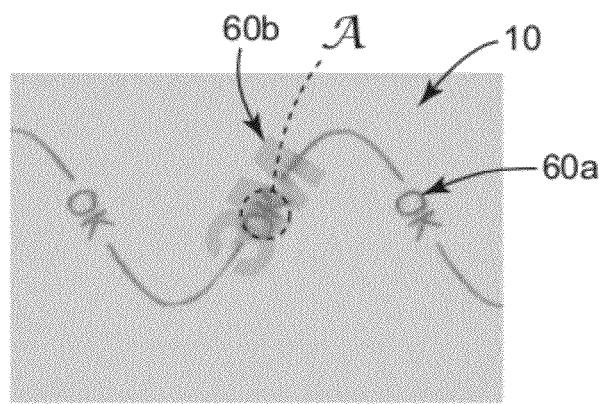
FIG. 8 is a photograph of one embodiment of a portion of microlens sheeting illustrating at least two composite images that appear to float above, in or below the sheeting in accordance with the present invention, where one of the composite images is viewable with an unaided eye and the other composite image is viewable with an aided eye.

After imaging, depending on the areas (portions) 82 in the mask 80 and depending upon the desirable viewable size of the composite image, a full or partially complete image(s) formed from the donor material 42a will be present on the first side 6 of material layer 14 of the sheeting 10 behind each sufficiently exposed microlens. The extent to which an image is formed behind each microlens 4 on the material layer 14 depends on the energy incident upon that microlens and the arrangement of the mask 80. Portions of an intended image may be distant enough from a region of microlenses that the radiation incident upon those microlens has an energy density lower than the level of radiation required to transfer corresponding donor material 42. Moreover, for a spatially extended image, when imaging with a fixed Numerical Aperature (NA) lens, not all portions of the sheeting will be exposed to the incident radiation for all parts of the intended image. As a result, portions of the intended image will not result in transferred radiation sensitive material, and only a partial image of the intended image will appear behind those microlenses on the material layer 14. By use of the mask 80, one may create the two different types of composite images, the overt and covert images, which are made up from the individual partially complete images of donor material 42a on the sheeting 10, examples of which are illustrated in FIGS. 8-12, 14-14A, 16-17, and 18A-D, In FIG. 4b, a first donor substrate 40a and mask 80 were used to create individual partially complete images of donor material 42a on the sheeting 10. After the sheeting 10 has been imaged using the first donor substrate 40a and mask 80, the first donor substrate 40a and mask 80 may be removed, and replaced with a second donor substrate 40b and new mask 80b, as illustrated in FIG. 5a. The method described above and illustrated in FIGS. 4a and 4b is then repeated as illustrated in FIGS. 5a and 5b, respectively. The second donor substrate 40b and new mask 80b are used to create images of donor material 42b on the sheeting 10. In one embodiment, the second donor substrate 40b includes a colorant that is different from the colorant in the first donor substrate 40a. This allows a user to form composite images that consists of two different colors. That is, the composite image is multi-colored, or has portions that are one color and portions that are a different color. Alternatively, the first and second donor substrates 40a, 40b, could be used to form two separate differently colored composite floating images, for example, as illustrated in FIG. 8. Alternatively, the colorants from the first and second donor substrates 40a, 40b may result in a composite image formed from the mixture of the two colorants. In another embodiment, the colorants in the first and second donor substrates 40a, 40b could include the same colorant. Any number of donor substrates 40 may be used to image the microlens sheeting 10 to form any number of floating composite images in a variety of different color combinations on a single sheeting 10. In addition, various masks 80 may be used to assist in forming the second composite images, discussed in more detail below.

Figure 6:
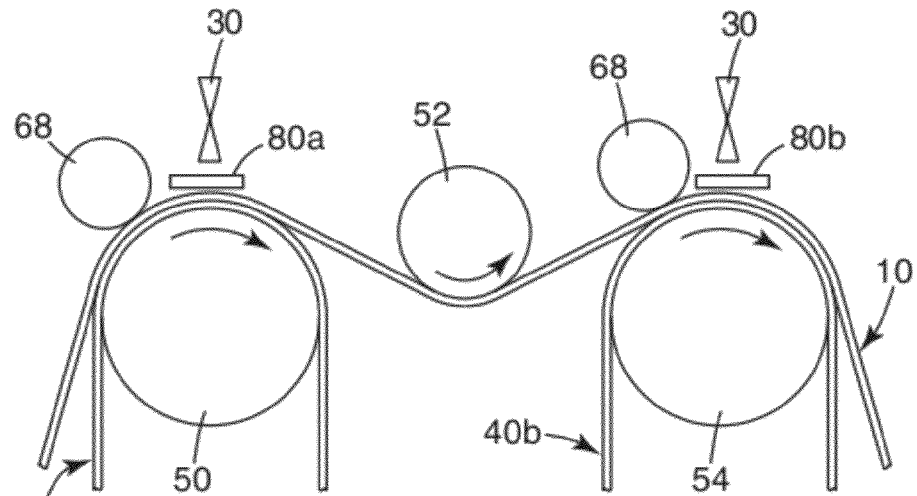
FIG. 6 schematically illustrates an apparatus for use with the embodiments of the methods illustrated in FIGS. 4 and 5.

FIG. 6 illustrates one embodiment of a roll-to-roll apparatus, which is convenient for imaging the microlens sheeting 10 with a first mask 80a and first donor substrate 40a and then imaging the microlens sheeting 10 with a second mask 80b and a second donor substrate 40b. The apparatus includes a first roll 50, a nip roller 68 stationed adjacent the first roll 50, a second roll 54, another nip roller 68 stationed adjacent the second roll 54, and an idle roll 52 between the first roll 50 and second roll 54. Stationed above each roll 50, 54 is a radiation source 30 with an appropriate optical train and accompanying mask 80, as described above. The first donor material 40a wraps around the first roll 50, and the second donor material 40b wraps around the second roll 54. As the microlens sheeting 10 moves through the apparatus, it first is pressed against the first donor substrate 40a and roll 50 and nip 68, as it is imaged by the radiation source 30 and mask 80a in the same manner as described above in reference to FIGS. 4a and 4b. Next, the sheeting 10 moves from the first roll 50 and consequently, away from the first donor material 40a. Next, the microlens sheeting 10 continues moving around the idle roll 52 and is pressed against the second donor substrate 40b and roll 54 and nip 68, as it is imaged by the radiation source 30 and mask 80b in the same manner as described above in reference to FIGS. 5a and 5b. The microlens sheeting 10 is pulled from the second roll 54 and consequently, away from the second donor material 40b. The resulting microlens sheeting 10 will have donor materials from both the first and second donor substrates 40a, 40b transferred onto the first side 6 of the layer of material 14 of the microlens sheeting 10 to create both the first type of composite images and the second type of composite images. The apparatus may include any number of rolls and radiation sources for depositing donor material from multiple donor substrates 40 and multiple masks 80 onto the microlens sheeting 10 to form multiple composite floating images on the sheeting 10.

Figure 7A:
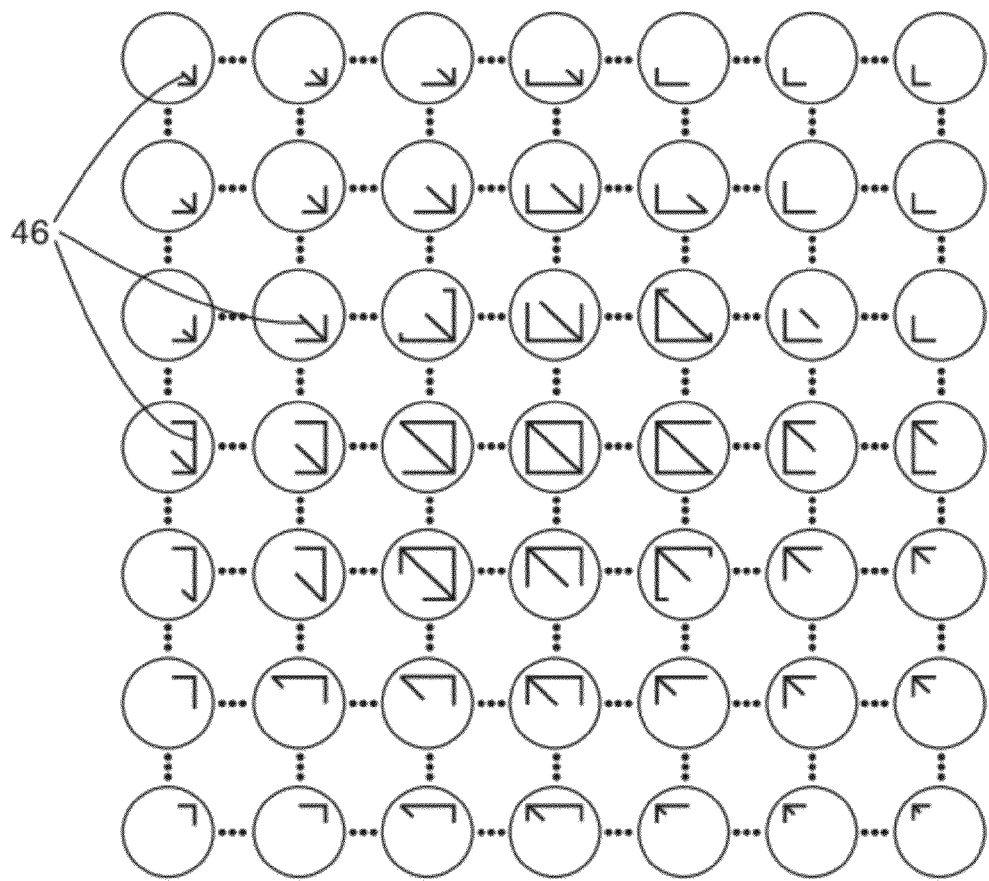
FIG. 7A is a plan view of one embodiment of a section of a microlens sheeting depicting sample images recorded in the material layer associated with individual microlenses made by the method of the present invention, and further showing that the recorded images range from complete replication to partial replication of the composite image.

FIG. 7A is a perspective view of a section of a microlens sheeting 10 depicting sample individual, partially complete images 46 formed by the radiation sensitive donor material 42 on the material layer 14 adjacent to individual microlens 4, as viewed from the microlensed side of the microlensed sheeting, and further showing that the recorded images range from complete replication to partial replication. These individual, partially complete images 46 make up both a first type of composite images, which are overt and viewable to a user with an unaided eye, and a second type of composite images, which are covert and viewable to a user with an aided eye. For convenience, the first type of composite images will subsequently be referred to below as "first composite images" and the second type of composite images as "second composite images." Examples of both the first and second composite images 60, 70 are illustrated in FIGS. 8-12, 14-14A, 16-17, 18A-D and 30.

Figure 7B:
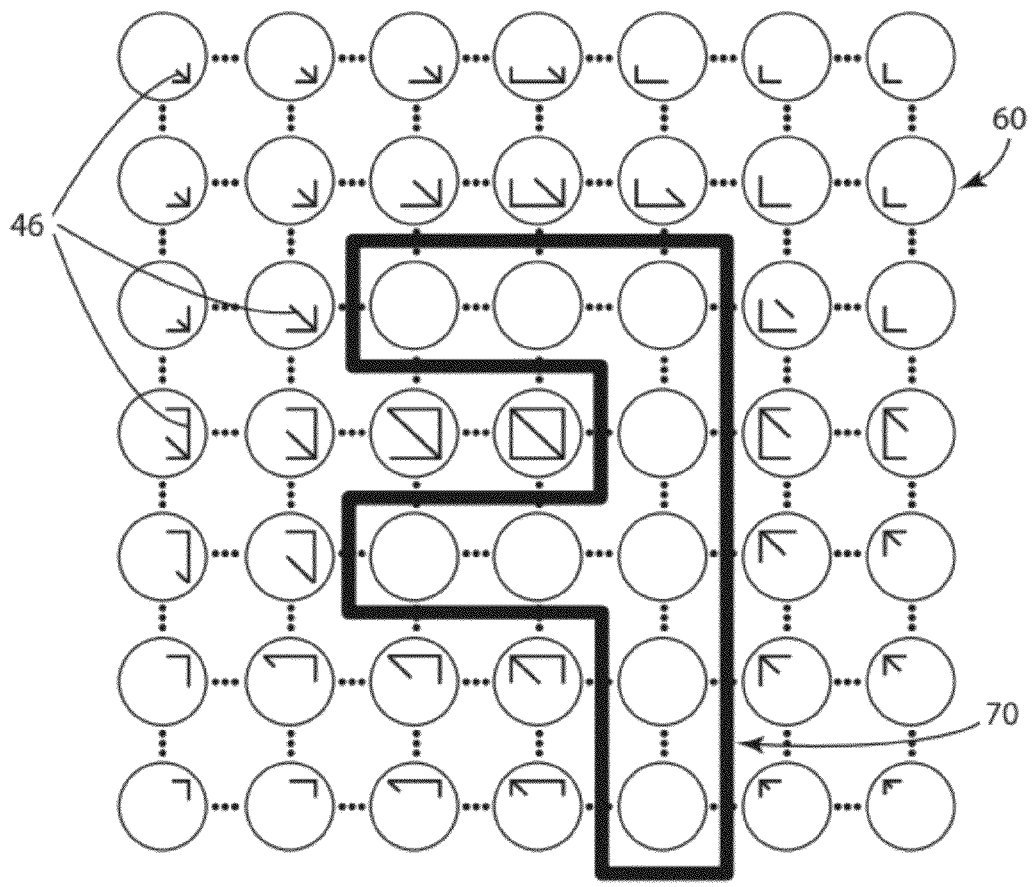
FIG. 7B is a plan view of another embodiment of a section of a microlens sheeting, similar to the microlens sheeting of FIG. 7A, except illustrating one embodiment of a negative contrast second composite image.

FIG. 7B is a perspective view of a section of a microlens sheeting 10 very similar to the microlens sheeting of FIG. 7A, except that this is an example of a sheeting including a negative contrast second composite image 70, formed by the absence of individual, partially complete images 46 formed by the radiation sensitive donor material 42 on the material layer 14 adjacent to individual microlens 4, as viewed from the microlensed side of the microlensed sheeting. The individual, partially complete images 46 form the first composite image 60 and the absence of donor material 42 in the area outlined in the form of a backwards "F" form the second composite image 70. By "negative contrast," as used herein including the claims, it is meant that the areas surrounding the second composite images are formed from individual, partially complete images 46 of donor material. In the case illustrated in FIG. 15, the letter "F" would appear from the microlens side of the sheeting as clear with a generally donor colored background.

Figure 7C:
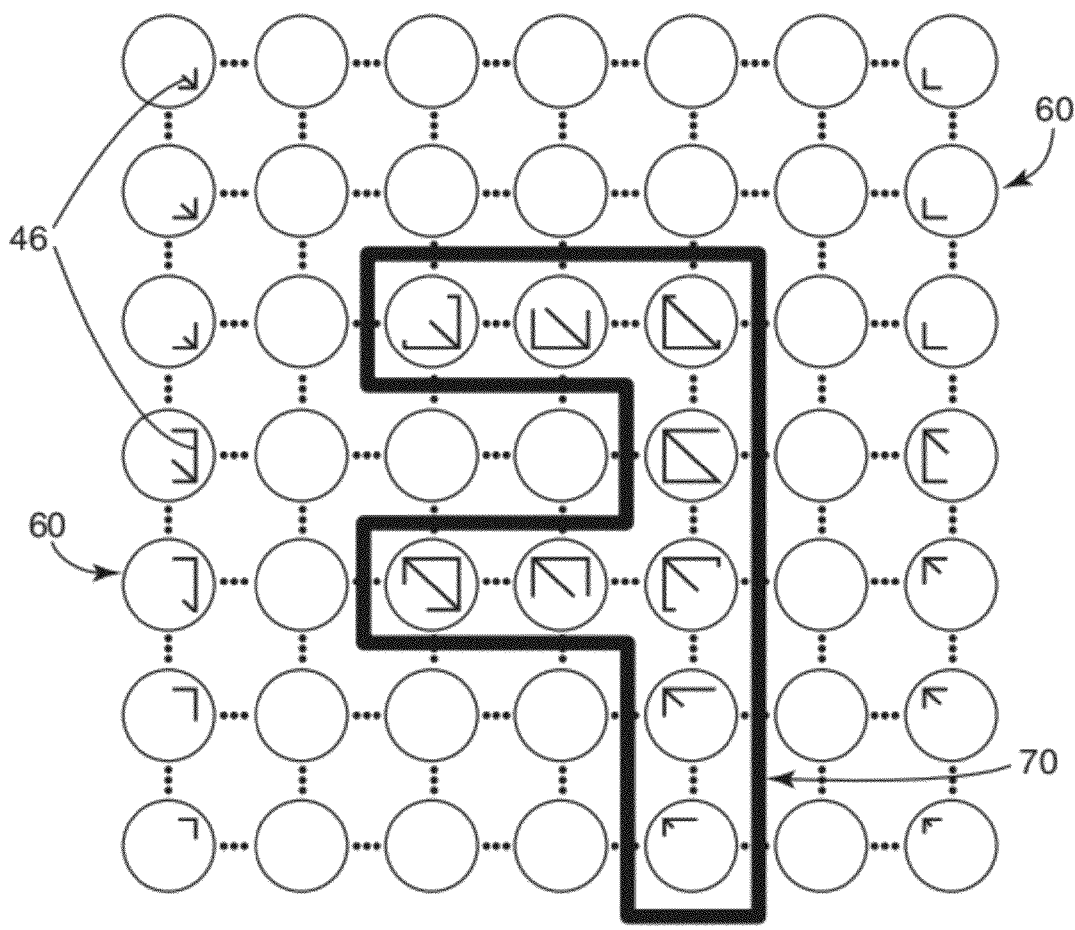
FIG. 7C is a plan view of another embodiment of a section of a microlens sheeting, similar to the microlens sheeting of FIG. 7A, except illustrating one embodiment of a positive contrast second composite image.

FIG. 7C is a perspective view of a section of a microlens sheeting 10 very similar to the microlens sheeting of FIG. 7B, except that this is an example of a sheeting including a positive contrast second composite image 70 and a first composite image 60, both formed by the individual, partially complete images 46 formed by the radiation sensitive donor material 42 on the material layer 14 adjacent to individual microlens 4, as viewed from the microlensed side of the microlensed sheeting. The individual, partially complete images 46 form the first composite image 60 and the presence of donor material 42 in the area outlined in the form of a backwards "F" form the second composite image 70. By "positive contrast," as used herein including the claims, it is meant that areas of the sheeting surrounding the second composite images are devoid of donor material. The second composite images are formed from individually, partially complete images 46. In the case illustrated in FIG. 7C, the letter "F" would appear from the microlens side of the sheeting as donor colored with a generally clear background.

Figure 9A:
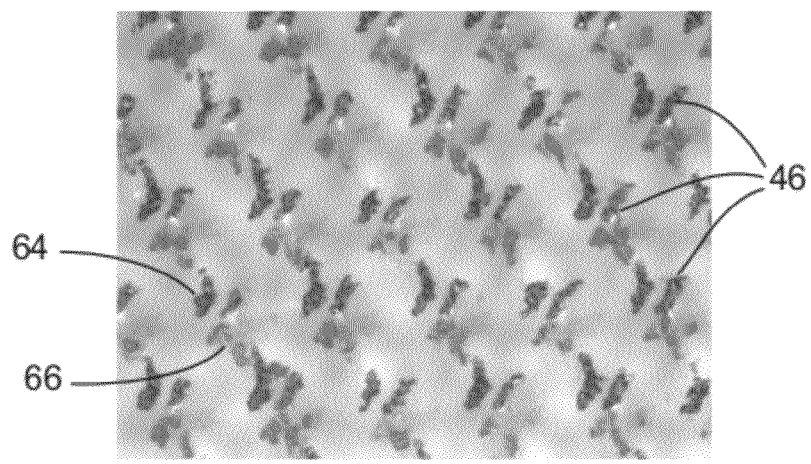
FIG. 9A is a photomicrograph of a portion of the composite images viewable through the lens sheeting with the aid of index matching fluid on the lenses of the microlens sheeting of FIG. 8, illustrating individual, partially complete images; which viewed together through the microlenses provide a first composite image that appears to the unaided eye and provide a second composite image that appears to the aided eye.
Figure 9B:
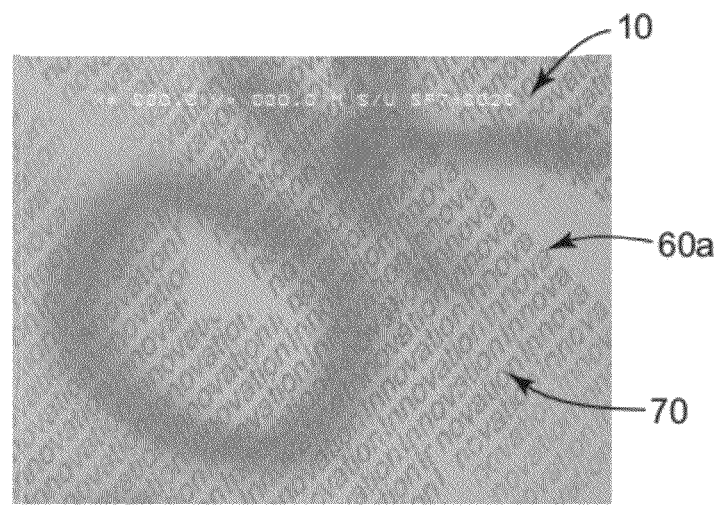
FIG. 9B is a photomicrograph view of the microlens sheeting of FIG. 8, illustrating both the first composite image that appears to the unaided eye and the a second composite image that appears to the aided eye.

FIGS. 8 and 9 show a microlens sheeting 10 imaged according to one embodiment of the method of this invention, using two radiation sensitive donor substrates 40, and one imaging step utilizing mask 80, to create multiple composite images of different colors. FIG. 9A is a magnified optical photomicrograph taken after applying index matching fluid to the lens sheeting 10 and viewed looking through the microlens 4 on the sheeting 10 to first side 6 displaying the donor materials on the first side 6 of material layer 14 on sheeting 10 shown in FIG. 8. The sheeting 10 includes a first composite image 60a that floats below the sheeting that appears as the letters "OK" floating below the sheeting 10 in the color of red and a first composite image 60b that appears as a filled in pattern of "3M" floating in the sheeting 10, in the color green, overlapping the "OK." The microlens sheeting 10 includes other first composite images in the form of "OK" floating below the sheeting and a sine wave floating above the sheeting. The sheeting 10 also includes a second composite image 70 that appears to float in the sheeting that appears as a the word "Innovation" that is shown more clearly in FIG. 9B, under magnification. The sheeting 10 was imaged with a first donor substrate having colorants of red. The sheeting 10 was then imaged with a second donor substrate having colorants of green and a mask 80, a portion of which is displayed in FIG. 15.

A portion of the section A that is indicated in FIG. 8 corresponds to the first side 6 of material layer 14 viewed through the lenses in FIG. 9. Specifically, FIG. 9A illustrates a magnified view of the individual, partially complete images 46 that together provide the intersection of the red and green first composite images 60a and 60b that appear to float below and in the sheeting in accordance with the present invention.

The image 46 has two portions, a first portion 64 of red donor material 42a, and a second portion 66 of green donor material 42b. Each image 46 corresponds generally to an individual microlens. The images 46 in FIG. 9A range in size from 24.5 to 27 um, however a range of other sizes are possible.

FIG. 9B is a magnified view of the approximate center of sheeting 10 of FIG. 8. Specifically, it illustrates how the first composite image 60a of the "3M" has areas composed of the second composite image.

Figure 10:
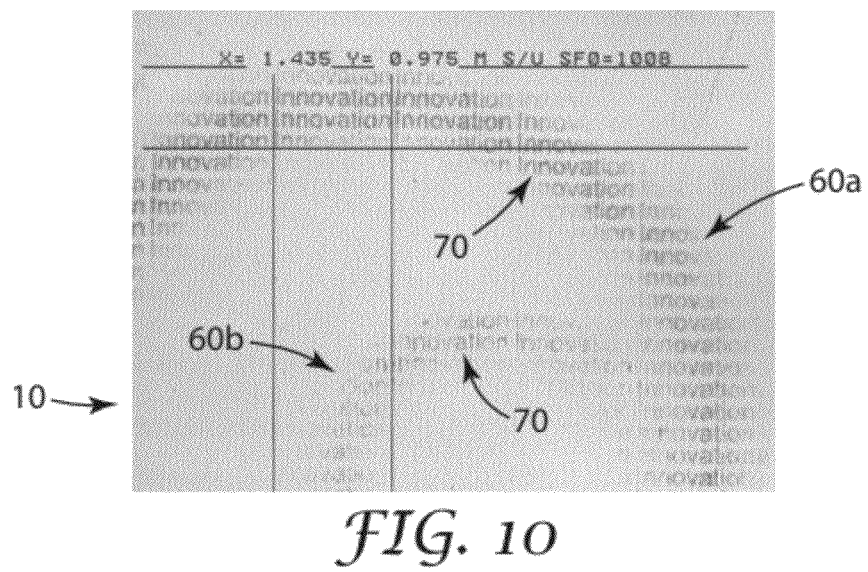
FIG. 10 is a photomicrograph of a portion of the microlens sheeting of FIG. 12 using a magnifier to illustrate the composite image that is viewable with an aided eye.

FIG. 10 shows a magnified view of microlens sheeting 10 imaged according to one embodiment of the method of this invention, using one radiation sensitive donor substrates 40 to create multiple composite images of the same color and a mask. This magnified view is convenient for describing the second composite images 70 and the relationship between the first composite images 60 and second composite images 70. As mentioned above, the first composite images 60 are viewable to a user with an unaided eye and the second composite images 70 are viewable to a user with an aided eye, in other words with some type of magnifier or special viewer. Examples of suitable magnifiers include: a simple magnifying glass (of 10×), a 10-15× loupe, and a low power microscope (10×-50×). The first composite images 60a and 60b are in the form of circles. A user could see both 60a, 60b with her unaided eye and verify that the document or object to which the microlens sheeting 10 was attached was authentic. To provide an additional level of protection, a user may use a magnifier to enhance or magnify her view of the first composite image 60a or 60b, as illustrated in FIG. 10. Under the magnified view, the user may view the second composite images 70, which are made of the word "Innovation." As illustrated, the first composite images are in the form of semicircles 60a, 60b and include second composite images 70 in the form of the word "Innovation." This is one exemplary example of how the second composite images 70 are aligned with the first composite images 60. By "aligned," as used herein, including the claims, it is meant there is some relationship between the first composite image and the second composite image, such that when looking at the first composite image under a magnifier, you can view the second composite image.

In one exemplary embodiment, the second composite images 70 appear to float in the plane of the microlens sheeting 10. To create this embodiment, the mask 80 is placed adjacent the lens sheeting as indicated in FIG. 4a. The radiation source is directed to form the first composite image and the mask 80 simultaneously creates the second composite images 70. The radiation source 30 is focused above or below the lens sheeting 10. Therefore, the first composite image 60 floats above or below the sheeting, corresponding to the location of the radiation focal points. The second composite image 70, formed due to the utilization of mask 80, appears to float in or at the surface of the lens film 10, since the mask areas (portions) 82 are placed adjacent to the lenses of film 10. The areas (portions) 82 may require magnification to visualize in this embodiment, and therefore create features in the film 10 that may require magnification to visualize. However, the second composite images 70 may float above, or below the sheeting, or any combination of floating above, in, or below the sheeting with proper placement and design of the mask 80.

FIG. 10 displays a photograph of micrographics formed in alignment with a first composite image 60a in the form of a circle floating above the sheeting 10 and another first composite image 60*b* in the form of a circle floating below the sheeting 10. Both the circles 60*a* and 60*b* and the second composite images 70 are red.

FIG. 10 is also an example where the second composite images 70 are in the form of microtext. Microtext is one example of micrographics. Micrographics are small, high resolution graphic features, such as alpha-numeric symbols, characters, or designs that are sized in the range of approximately 25 to 200 micron feature height and 10 to 100 micron line width and are typically viewable under a magnifier having strength of 10× to 50×.

Figure 11:
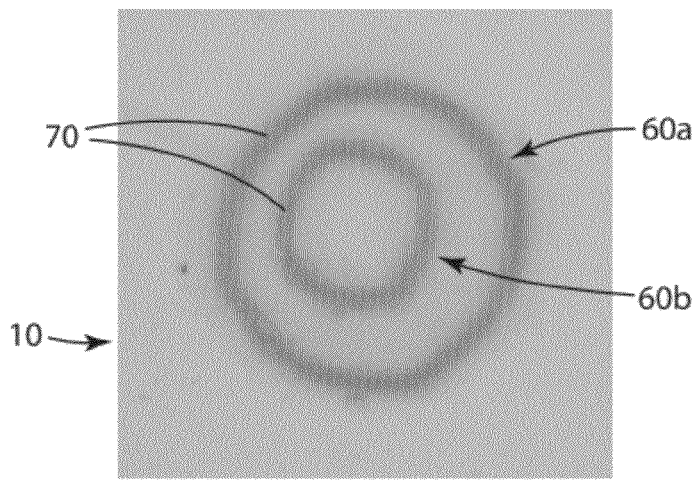
FIGS. 11 and 12 are photographs of another embodiment of a portion of microlens sheeting illustrating at least two composite images that appear to float above, in or below the sheeting in accordance with the present invention, where one of the composite images appears to move relative to the sheeting as the viewing position changes.
Figure 12:
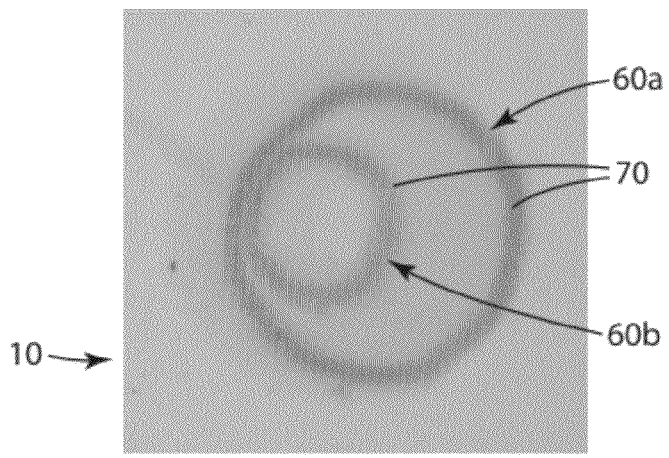

FIGS. 11 and 12 illustrate an unmagnified view of the microlens sheeting of FIG. 10 taken at two different viewing positions relative to the sheeting. FIG. 11 was taken an angle of 0° relative to the sheeting. FIG. 12 was taken an angle of 6° relative to the sheeting. These Figures are convenient for illustrating how the first floating composite images 60 appear to move relative to the sheeting as the viewing position changes relative to the sheeting. In this case, as the viewing position changes from FIG. 11 to FIG. 12, the middle circle 60*b* appears to move left, where the outer circle 60*a* appears to move right, as the sheeting 10 is tilted 6° to the right.

Figure 13:
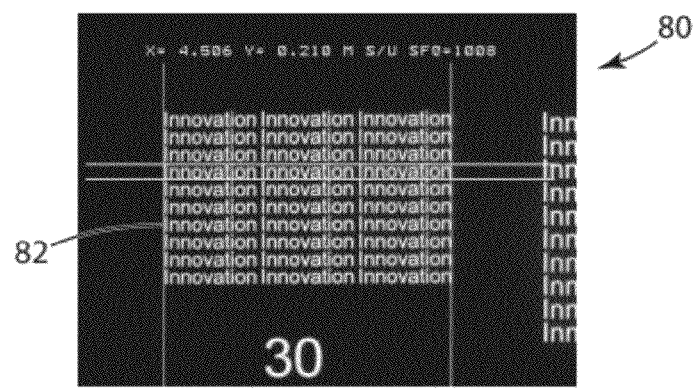
FIG. 13 illustrates one example of a negative contrast mask useful with one of the methods in accordance with the present invention.
Figure 14:
FIG. 14 is a photomicrograph of a positive contrast second composite image that appears to the aided eye, which was formed using a mask similar to that shown in FIG. 13.
Figure 14A:
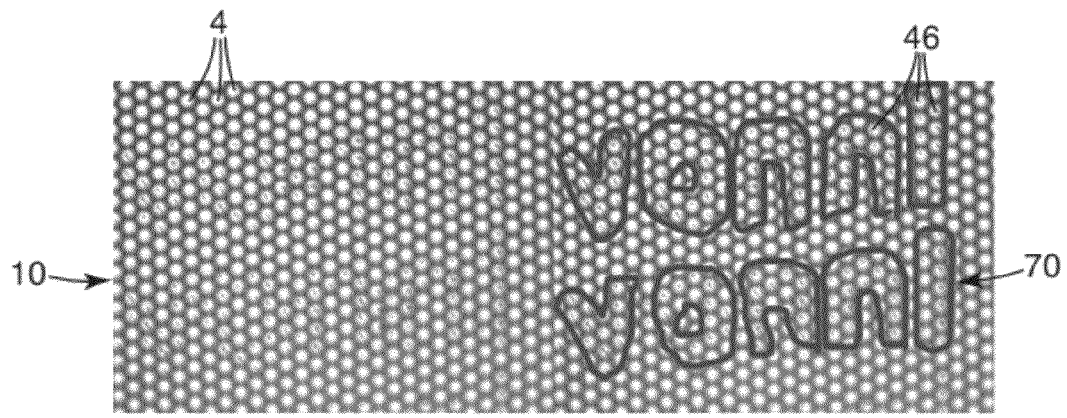
FIG. 14A is a photomicrograph of the portion A of FIG. 14 with certain portions outlined to illustrate the individual images under certain microlenses that provide a second composite image that is viewable to the aided eye.

FIG. 13 illustrates one exemplary mask 80 similar to the mask that was used to create the microlens sheeting 10 illustrated in FIGS. 10 and 14-14A in all aspects but similar dimensions. (A mask with opposite contrast was used for FIG. 16.) This negative mask 80 has areas (portions) 82 transparent to visible and near infrared radiation to form an array of the word "Innovation". This mask is an example of a negative mask used to create positive contrast second composite images. As mentioned above, by "positive contrast," it is meant that the lines of the second composite images are formed from solid lines of the donor color. For the mask illustrated in FIG. 13, the word "Innovation" appears in white with a black background. Composite images formed using this mask will have the first composite image similar in color to the color of the first donor material with word "Innovation," the second composite image also similar to the color of the first donor material.

FIG. 14 is a magnified view of the second composite images 70 in the microlens sheeting, which were formed using the mask illustrated in FIG. 13. In this embodiment, the letters appear as red and the background appears as white. This arrangement is created by using the radiation source to adhere donor material to the microlens sheeting accessible through the areas (portions) 82 of the mask of FIG. 13.

FIG. 14A illustrates an even more magnified view of a portion of the microlens sheeting of FIG. 14 indicated by portion A, except that FIG. 14A is a view from the backside of the microlens sheeting on side 6, opposite the microlens 4. It is possible in this view to see the individual, partially complete images 46 formed by the radiation sensitive donor material 42 on the material layer 14 adjacent to individual microlens 4. For clarity, some of the adjacent partially complete images 46 have been outlined to help illustrate how they form the complete image of the word "Innovation."

Figure 15:
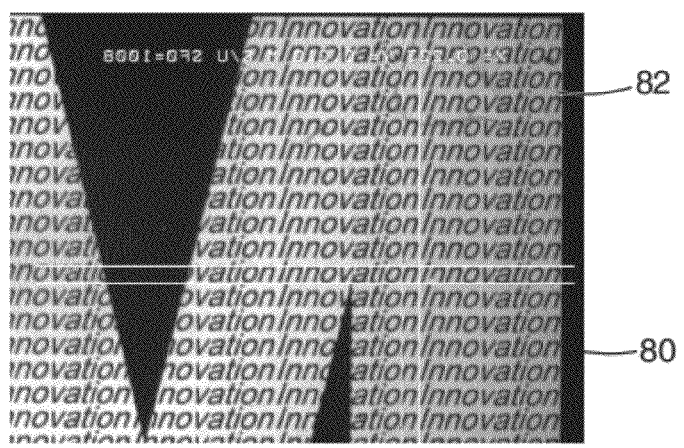
FIG. 15 illustrates another example of a portion of a positive contrast mask used with one of the methods in accordance with the present invention.

FIG. 15 illustrates another exemplary mask 80 that is used to create the negative contrast second composite images 70 in FIGS. 8 and 9B. For the mask illustrated in FIG. 15, the word "Innovation" appears black with a generally white background. Composite images formed using this mask will have the first composite image similar to the color of the first donor material with the second composite image, the word "Innovation" appearing clear (or white).

Figure 16:
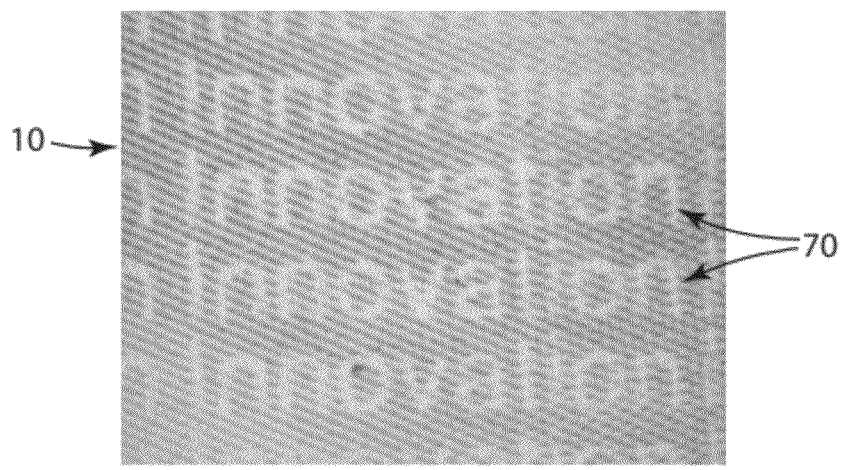
FIG. 16 is a photomicrograph of a negative contrast composite image that appears to the aided eye.

FIG. 16 illustrates the resulting second composite images 70 formed using a mask similar to the mask of FIG. 15, and imaging horizontal lines with focal point approximately 6 mm above the surface of the lens sheeting 10. In this embodiment, the letters appear as white and the background appears as a red donor color. This arrangement is created by using the radiation source to adhere donor material to the microlens sheeting accessible through the areas (portions) 82 of the mask of FIG. 15.

Figure 17:
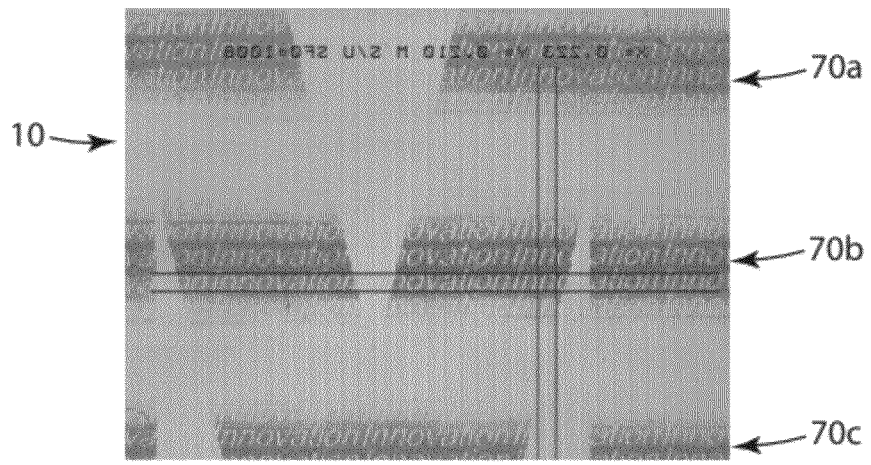
FIG. 17 is a photomicrograph of one embodiment of microlens sheeting with a composite image that is an angularly variable array of images.

FIG. 17 is a less magnified view of FIG. 16 depicting the exemplary microlens sheeting 10 of FIG. 18 having second composite images 70 of the word "Innovation" and including a first composite image that comprises a pattern defined by the letter "M."

FIGS. 18A-D are convenient for illustrating the changing views of the composite images 60, 70 as the viewing angle changes relative to the sheeting 10. FIG. 18A illustrates a view of the microlens sheeting of FIG. 17 at a viewing angle of 0° relative to the sheeting. FIG. 18B illustrates a view of the microlens sheeting of FIG. 17 at an angle of 3° relative to the sheeting. FIG. 18C illustrates a view of the microlens sheeting of FIG. 17 at an angle of 6° relative to the sheeting. FIG. 18D illustrates a view of the microlens sheeting of FIG. 17 at an angle of 9° relative to the sheeting. Here, the increasing tilt angle from 0° to 9° indicates tilting the top of lens sheeting 10 (i.e., the top of the 3M) away from the viewer.

Figure 19:
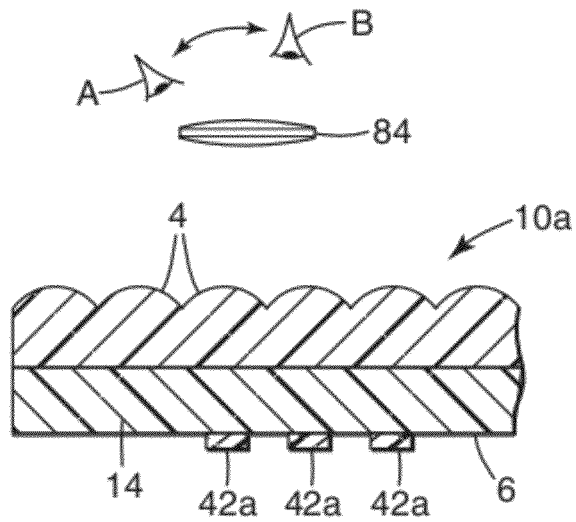
FIG. 19 schematically illustrates the sheeting of the present invention and a magnifier, where the viewing angle moves relative to the sheeting.

FIGS. 18A-D all illustrate a microlens sheeting 10 including a first composite image 60 that comprise a pattern defined by the word "3M." In reality, the appearance of the stripes are made of first composite images 60 that are aligned to second composite images 70 that are not viewable at the magnification displayed in FIG. 18A-D. This microlens sheeting 10 includes second composite images 70 that are an angularly variable array of images. In other words, the array of images viewable to a user depends on the angle of the view relative to the sheeting, and as a consequence, the image changes or is variable as the user changes their angle of view relative to the sheeting. As the view relative to the sheeting changes, the image that is seen changes. FIG. 19 illustrates one example of how the view relative the sheeting may change. The user or viewer is first in position A relative the sheeting, and then moves to position B that is in a different position relative to the sheeting. As the user is looking through a magnifier 84, their view of the second composite images 70 changes, depending on their view.

Dotted lines B and C have been added to the FIGS. 18A-18D to help provide clarity in how the first composite image 60 changes with each view. In the first viewing angle illustrated in FIG. 18A, the bottom of the "3M" appears to be lined up with the dotted line C, whereas the top of the "3M" appears to be some distance away from the dotted line B. In the next viewing angle illustrated in FIG. 18B, the bottom of the "3M" appears to be moving away from the dotted line C, whereas the top of the "3M" appears to be moving toward the dotted line B. In the next viewing angle illustrated in FIG. 18C, the bottom of the "3M" appears to be some distance away from the dotted line C, whereas the top of the "3M" appears to be more closely lined up with the dotted line B. And, in the last viewing angle illustrated in FIG. 18D, the bottom of the "3M" appears to be some distance away from the dotted line C, whereas the top of the "3M" appears to be lined up with the dotted line B. This movement is as would be expected for an image located above the sheeting and tilted away from the viewer as previously described. If the first composite images were floating below sheeting 10, the stripes would appear to move in the reverse direction.

Figure 19A:
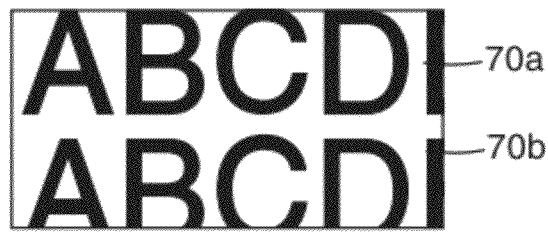
FIG. 19A schematically illustrates the sheeting of FIG. 19 from viewing angle A using the magnifier to view the second composite images.
Figure 19B:
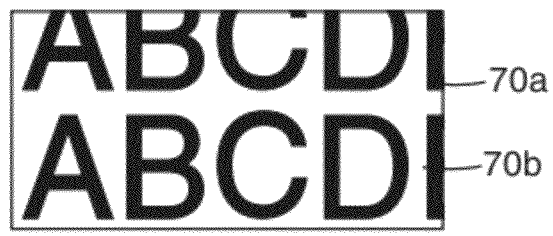
FIG. 19B schematically illustrates the sheeting of FIG. 19 from viewing angle B using the magnifier to view the second composite images.

FIGS. 19A and 19B schematically illustrate one embodiment of an angularly variable array of second composite images 70, where in this specific embodiment, the text appears to be scrolling as the user continues to view the sheeting as he moves from position A to position B. By the term "scrolling" as used herein, including the claims, the displayed text or graphics appears to move up, down, or across as the section is viewed by the user. In FIG. 19A, there are two second composite images 70*a*, 70*b*, in the form of the text "ABCDE."

In the first view, illustrated by FIG. 19A, as viewed from position A relative to the sheeting through the magnifier 84, the user is able to view the entire ABCDE of the second composite image 70*a*, and the bottom portion of the ABCDE of the second composite image 70*b* is cut off from their view. After moving to the second view, illustrated by FIG. 19B, as viewed from position B relative to the sheeting through the magnifier 84, the user is able to view the entire ABCDE of the second composite image 70*b*, and the top portion of the ABCDE of the second composite image 70*a* is cut off from their view. As the viewer moves from position A to position B, her view relative to the sheeting changes and it appears to the user that the text is moving or scrolling in a particular manner. The direction of the scrolling relative to the tilting of the sheeting is dependant on whether the first composite image is floating above or below the sheeting. The rate at which the scrolling occurs is dependent on the magnitude of the float. The larger in magnitude the floating height of the composite image is above or below the lens sheeting 10, the higher the rate of scroll as the viewing angle of the sheeting is changed.

Overall, the composite floating images 60 and 70 can also be thought of as the result of the viewing of many images 46, through lens sheeting 10, each lens of lens sheeting having different perspectives of two real objects. The first forming the first composite image 60 and the second forming the second composite image 70 defined by the mask 80. The many unique images are formed through an array of miniature lenses, all of which "see" the objects or images from a different vantage point. Behind the individual miniature lenses, a perspective of the images are created by the donor material on the material layer that depends on the shape of the images and the direction from which the imaging energy source was received. In some embodiments of the method of the present invention, only that portion of the image or object seen by the lens that has sufficient energy to result in the transfer of some of the radiation sensitive donor material will be recorded. Portions of the image or object that correlate to the lens being exposed to a correspondingly greater energy level may generally result in a greater amount of donor material being transferred, i.e. may result in the transferred donor material forming images 46 having a greater elevation above the first side 6 of the material layer 14 of the sheeting 10.

The "object" to be imaged is formed through the use of an intense radiation source by either tracing the outline of the "object" or by the use of a mask defining the first composite image. For the image thus recorded to have a composite aspect, the light from the object must radiate over a broad range of angles. When the radiation from an object is coming from a single point of the object and is radiating over a broad range of angles, all the radiation rays are carrying information about the object, but only from that single point, though the information is from the perspective of the angle of the radiation ray. Now consider that in order to have relatively complete information about the object, as carried by the radiation rays, light must radiate over a broad range of angles from the collection of points that constitute the object. In this invention, the range of angles of the radiation rays emanating from an object is controlled by optical elements interposed between the radiation source and the microlens sheeting. These optical elements are chosen to give the optimum range of angles necessary to produce the composite images. The best selection of optical elements results in a cone of radiation whereby the vertex of the cone terminates at the position of the object.

Geometric optics will be used to describe the formation of various composite images according to the present invention. As noted previously, the imaging processes described below are preferred, but not exclusive, embodiments of the invention.

As noted above, a preferred manner of providing the image patterns on the layer of material adjacent the microlenses is to use a radiation source and a mask to transfer a radiation sensitive donor material which is placed adjacent the material layer of the microlens sheeting to form an image on the material layer.

A. Creating a Composite Image That Floats Above the Sheeting

Figure 20:
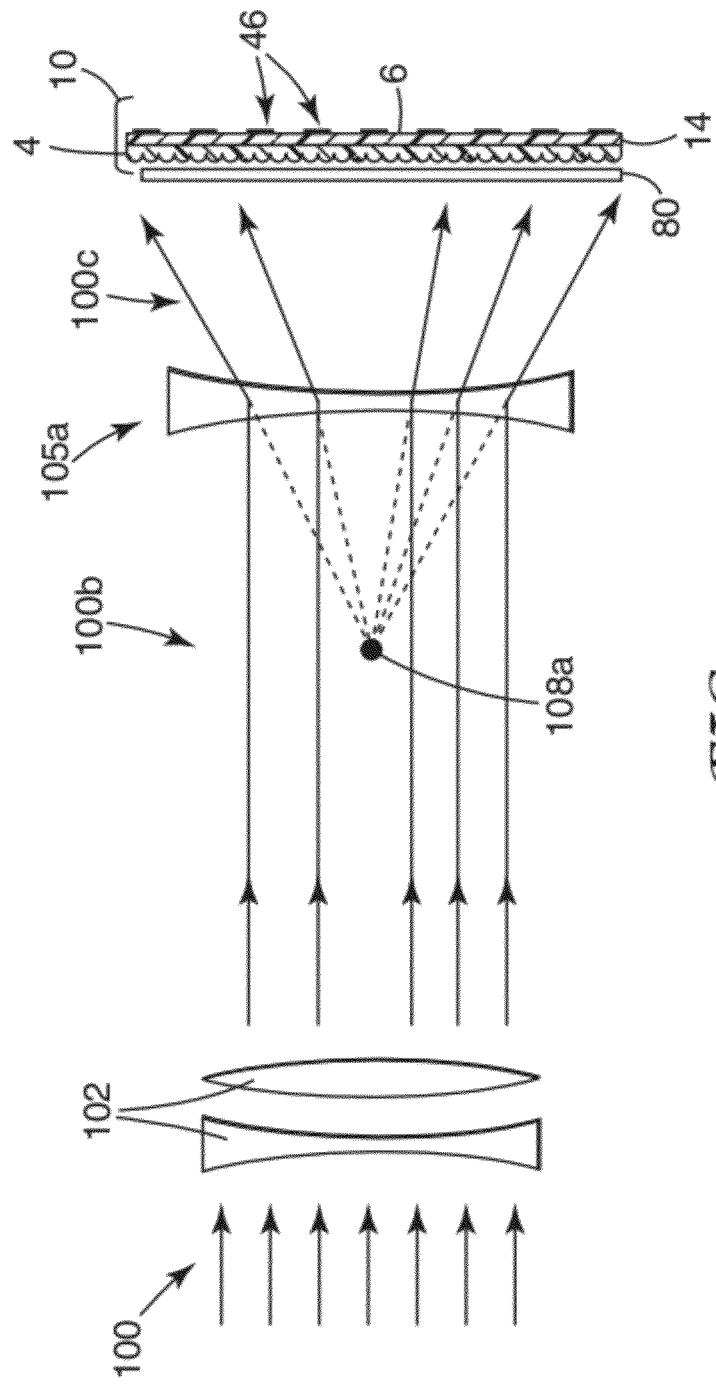
FIG. 20 is a geometrical optical representation of the formation of the first composite images that appears to float above the microlens sheeting and the second composite image that appears to float in the sheeting.

Referring to FIG. 20, incident radiation 100 (light, in this example) is directed and collimated by optics 102 that directs the light 100*b* towards a diverging lens 105*a*. From the diverging lens, the light rays 100*c* diverge toward the mask 80 and microlens sheeting 10.

The energy of the light rays is transmitted through transparent areas (portions) 82 by the mask 80 and impinging upon the microlens sheeting 10 is focused by the individual microlens 4 approximately at the interface between the material layer 14 and a donor substrate (not shown). This focused radiation results in the transfer of at least a portion of the radiation sensitive material and/or the colorant in the donor substrate to provide images 46 on the surface 6 of material layer 14, the size, shape, and appearance of which depends on the interaction between the light rays, the microlenses, and the radiation sensitive donor substrate.

The arrangement shown in FIG. 21 would provide a sheeting having a composite image that appears to an observer to float above the sheeting as described below, because diverging rays 100*c*, if extended backward through the lens, would intersect at the focal point 108*a* of the diverging lens. Stated differently, if a hypothetical "image ray" were traced from the material layer through each of the microlenses and back through the diverging lens, they would meet at 108*a*, which is where a portion of the composite image appears.

B. Viewing a Composite Image That Floats Above the Sheeting

A sheeting that has a composite image may be viewed using light that impinges on the sheeting from the same side as the observer (reflected light), or from the opposite side of the sheeting as the observer (transmitted light), or both. FIG. 21 is a schematic representation of a composite image that appears to the unaided eye of an observer A to float above the sheeting when viewed under reflected light. An unaided eye may be corrected to normal vision, but is not otherwise assisted by, for example, magnification or a special viewer. When the imaged sheeting is illuminated by reflected light, which may be collimated or diffuse, light rays are reflected back from the imaged sheeting in a manner determined by the donor material 42 in the individual images 46 struck by the light rays. By definition, the images formed by the donor material 42 appear different than the non-imaged portions of the material layer 14 where no donor material 42 is present, and thus an image can be perceived.

For example, portions (e.g. a specific wavelength range) of the light L1 may be reflected by the donor material 42 back toward the observer, the summation of which creates a colored composite image that appears to float above the sheeting, a portion of which is shown at 108*a*. In short, specific portions of the visible electromagnetic spectrum can be reflected from the imaged portions 46 or reflected from a laminate substrate such as a passport (not shown) and absorbed or scattered by imaged portions 46, which means that a portion of a colored composite image will be apparent at 108a. However, the donor material 42 may not reflect light L2 back toward the observer well, or at all, or it may significantly absorb light reflected from a laminate surface and subsequently transmitted through the donor material 42. Thus, the observer may detect the absence of light rays at 108a, the summation of which creates a black composite image that appears to float above the sheeting, a portion of which appears at 108a. In short, light may be partially reflected from the entire sheeting or highly reflected from a laminate behind the sheeting except the imaged portions 46, which means that a relatively dark composite image will be apparent at 108a.

It is also possible that the imaged material 42 would reflect or partially absorb incident light, and a dark laminate (not shown) placed adjacent to the imaged portions 46 would absorb the light to provide the contrast effect required to provide a composite image. The composite image under those circumstances would appear as a relatively bright composite image in comparison to the remainder of the sheeting with laminate (not shown), which would appear relatively dark. Various combinations of these possibilities can be selected as desired.

Certain imaged sheetings can also be viewed by transmitted light, as shown in FIG. 12. For example, when the imaged portions of the donor material 42 on the material layer 14 are translucent and absorb portions of the visible spectrum, and the nonimaged portions are transparent or translucent, but highly transmissive, then some light L3 will be selectively absorbed or reflected by the donor material 42, and directed by the microlenses toward the focal point 108a. The composite image will be apparent at the focal point, where it will, in this example, appear darker and colored compared to the remainder of the sheeting.

C. Creating a Composite Image That Floats Below The Sheeting

Figure 23:
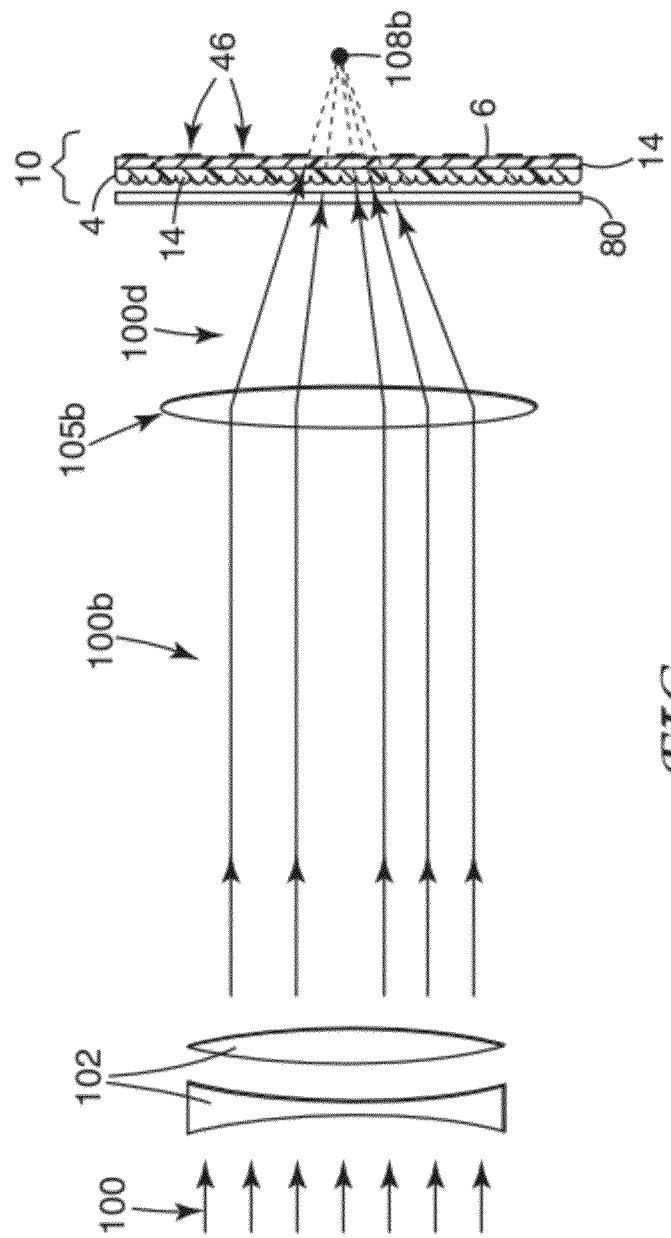
FIG. 23 is a geometrical optical representation of the formation of the first composite images that when viewed will appear to float below the microlens sheeting and the second composite image that appears to float in the sheeting.

A composite image may also be provided that appears to be suspended on the opposite side of the sheeting from the observer. This floating image that floats below the sheeting can be created by using a converging lens instead of the diverging lens 105 shown in FIG. 20. Referring to FIG. 23, the incident energy 100 (light, in this example) is directed and collimated in a collimator 102 that directs the light 100b toward a converging lens 105b. From the converging lens, the light rays 100d are incident on the mask 80 and microlens sheeting 10, which is placed between the converging lens and the focal point 108b of the converging lens.

The energy of the light rays impinging upon the microlens sheeting 10 is focused by the individual microlens 4 approximately into the interface area between the material layer 14 and a radiation sensitive donor substrate (not shown). This focused radiation transfers a portion of the radiation sensitive material in the donor substrate to provide images 46 made from the donor material 42, the size, shape, and appearance of which depends on the interaction between the light rays, the microlens sheeting, and the donor substrate. The arrangement shown in FIG. 23 would provide a sheeting 10 having a composite image that appears to an observer to float below the sheeting as described below, because converging rays 100d, if extended through the sheeting, would intersect at the focal point 108b of the diverging lens. Stated differently, if a hypothetical "image ray" were traced from the converging lens 105b through each of the microlens and through the images on the material layer formed from the donor material 42 associated with each microlens, they would meet at 108b, which is where a portion of the composite image appears.

D. Viewing a Composite Image That Floats Below the Sheeting

Figure 24:
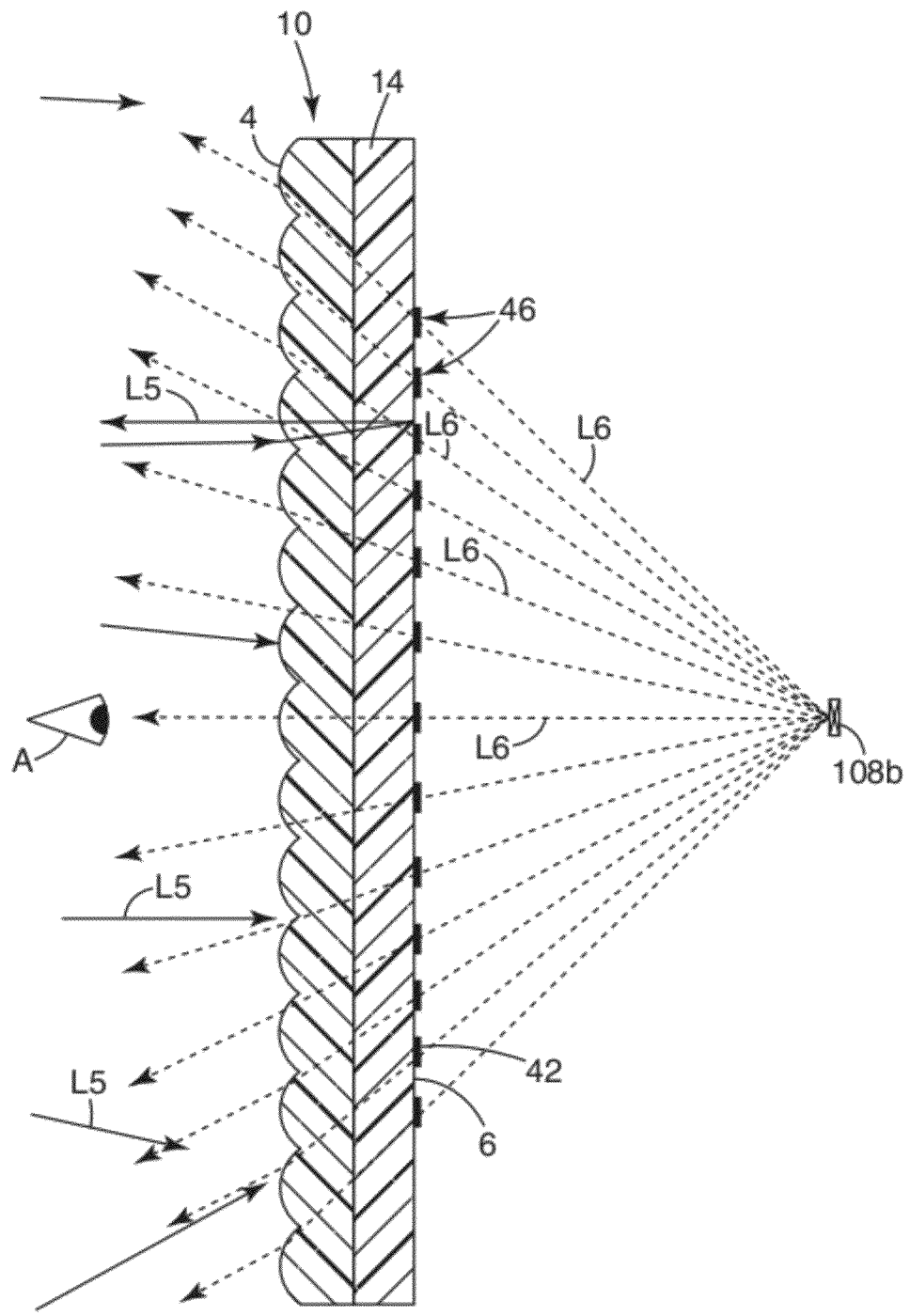
FIG. 24 is a schematic representation of a sheeting having a first composite image that appears to float below the inventive sheeting when the sheeting is viewed in reflected light.

Sheeting having a composite image that appears to float below the sheeting can also be viewed in reflected light, transmitted light, or both. FIG. 24 is a schematic representation of a composite image that appears to float below the sheeting when viewed under reflected light. For example, portions of the visible spectrum of light L5 may be reflected by the donor material 42 on the material layer 14 back toward the observer. Thus, the observer may detect the presence of colored light rays which appear to originate from 108b, the summation of which creates a colored composite image that appears to float below the sheeting, a portion of which appears at 108b. In short, light may be reflected primarily from the imaged portions 46, which means that a darker colored composite image will be apparent at 108b. Alternatively, the incident light may be reflected by a laminate behind the material layer, portions of which are subsequently absorbed or scattered by the donor material 42, and travel back toward the observer. Thus, the observer may detect the presence of colored light rays which appear to originate from 108b, the summation of which creates a colored composite image. In short, light may be reflected from a laminate behind the material layer and absorbed by imaged portions 46, which means that a darker colored composite image will be apparent at 108b.

It is also possible that the laminate behind the material layer would absorb incident light, and that the donor material 42 would reflect or partially absorb incident light, respectively, to provide the contrast effect required to provide a composite image. The composite image under those circumstances would appear as a relatively bright composite image in comparison to the remainder of the sheeting, which would appear relatively dark. Various combinations of these possibilities can be selected as desired.

Figure 25:
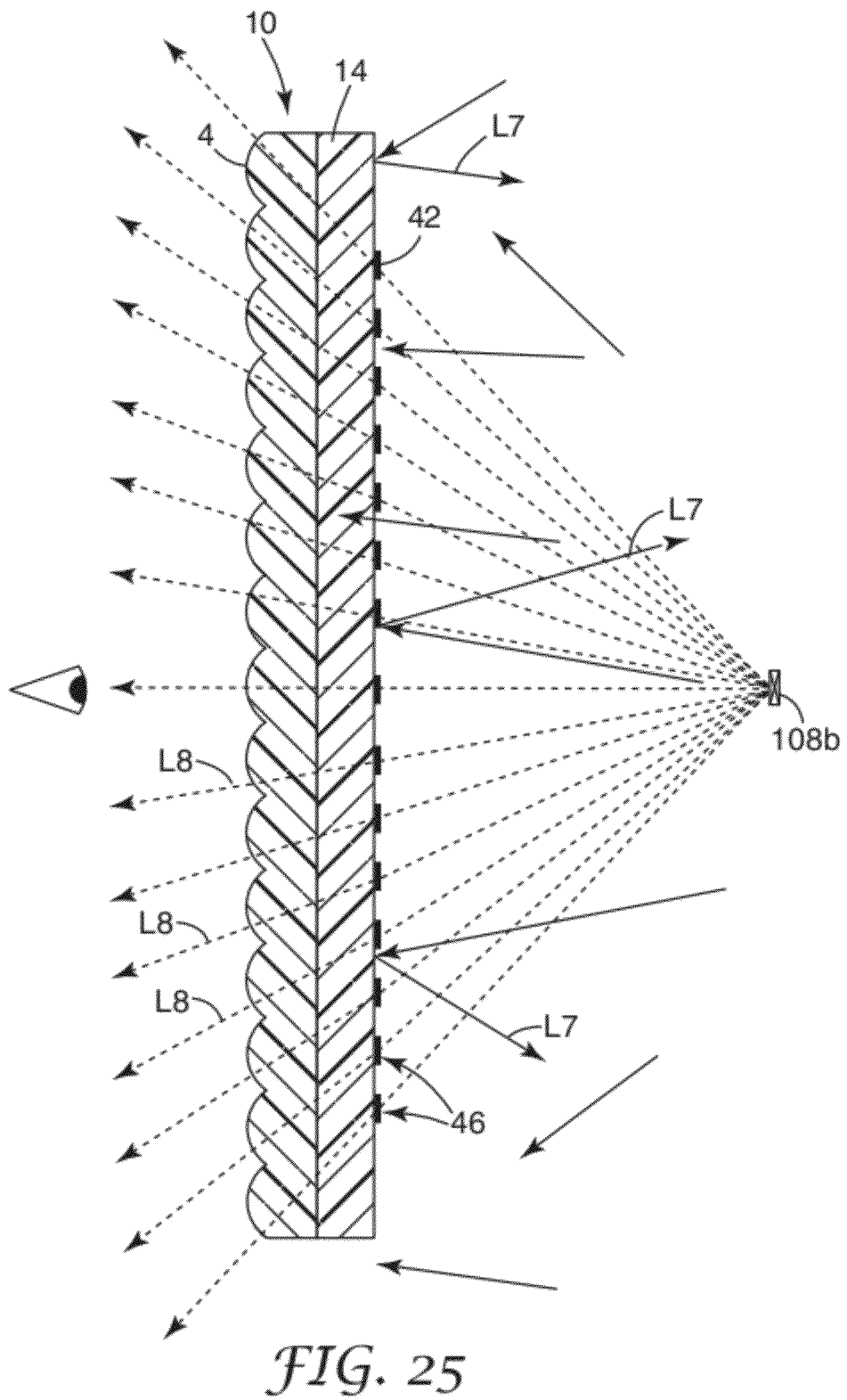
FIG. 25 is a schematic representation of a sheeting having a first composite image that appears to float below the inventive sheeting when the sheeting is viewed in transmitted light.

Certain imaged sheetings can also be viewed by transmitted light, as shown in FIG. 25. For example, when the imaged portions on the material layer 14 of donor material 42 are translucent and color absorbing and the nonimaged portions where no donor material 42 is present are transparent, then specific portions of the visible spectrum of light L7 will be absorbed or reflected by the donor material 42, while transmitted light L8 will be passed through the remaining portions on the material layer. The extension of those rays, referred to herein as "image rays," back in the direction of the incident light results in the formation of a composite image, a portion of which appears at 108b. The composite image will be apparent at the focal point, where, it will, in this example, appear darker and colored while the sheeting appears transparent.

Alternatively, if the imaged portions of donor material 42 on the material layer 14 are not translucent but the remainder of the material layer 14 is, then the absence of transmitted light in the areas of the images will provide a composite image that appears darker than the remainder of the sheeting.

Figure 21:
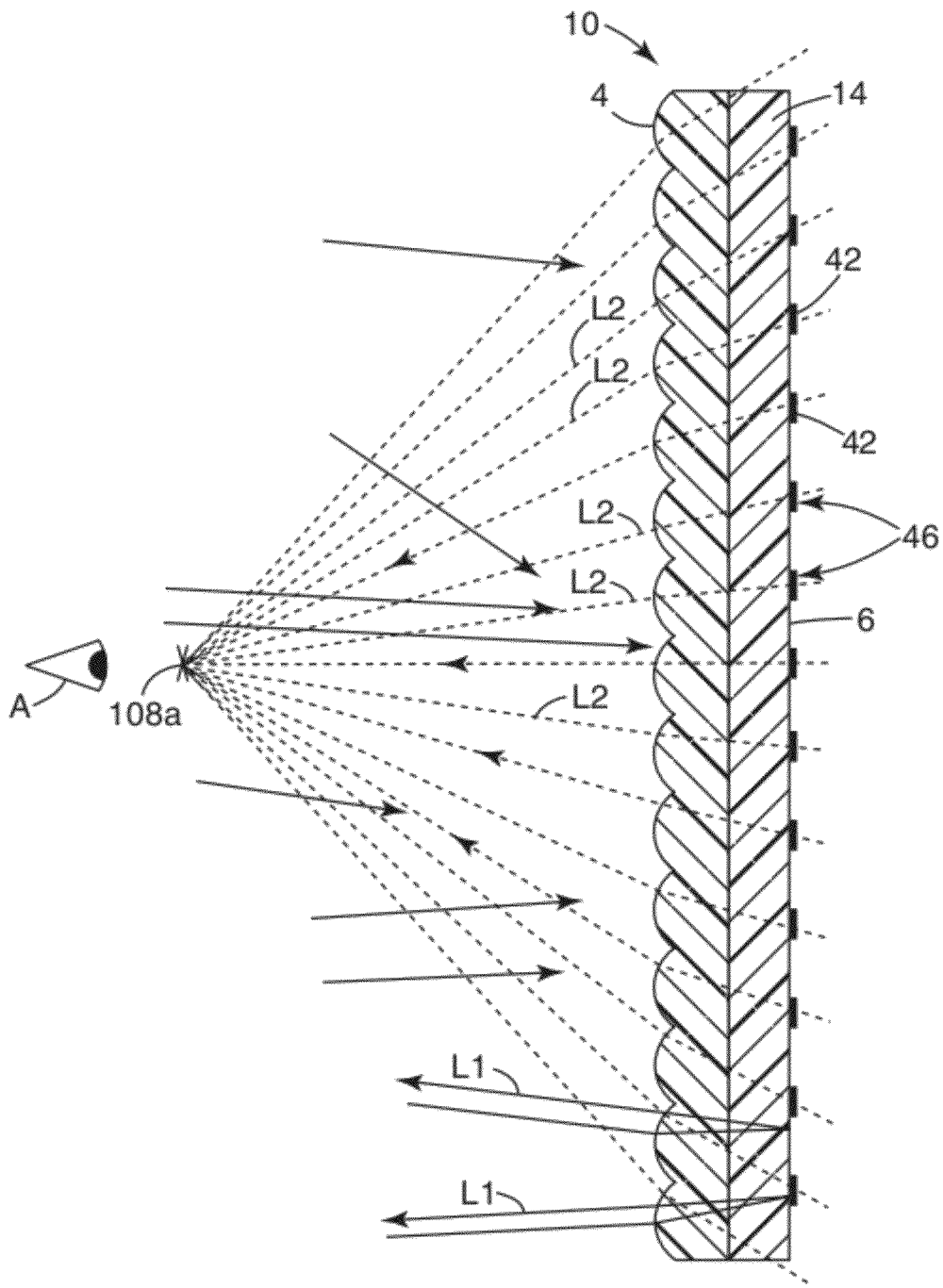
FIG. 21 is a schematic representation of a sheeting having a first composite image that appears to float above the inventive sheeting when the sheeting is viewed in reflected light.
Figure 22:
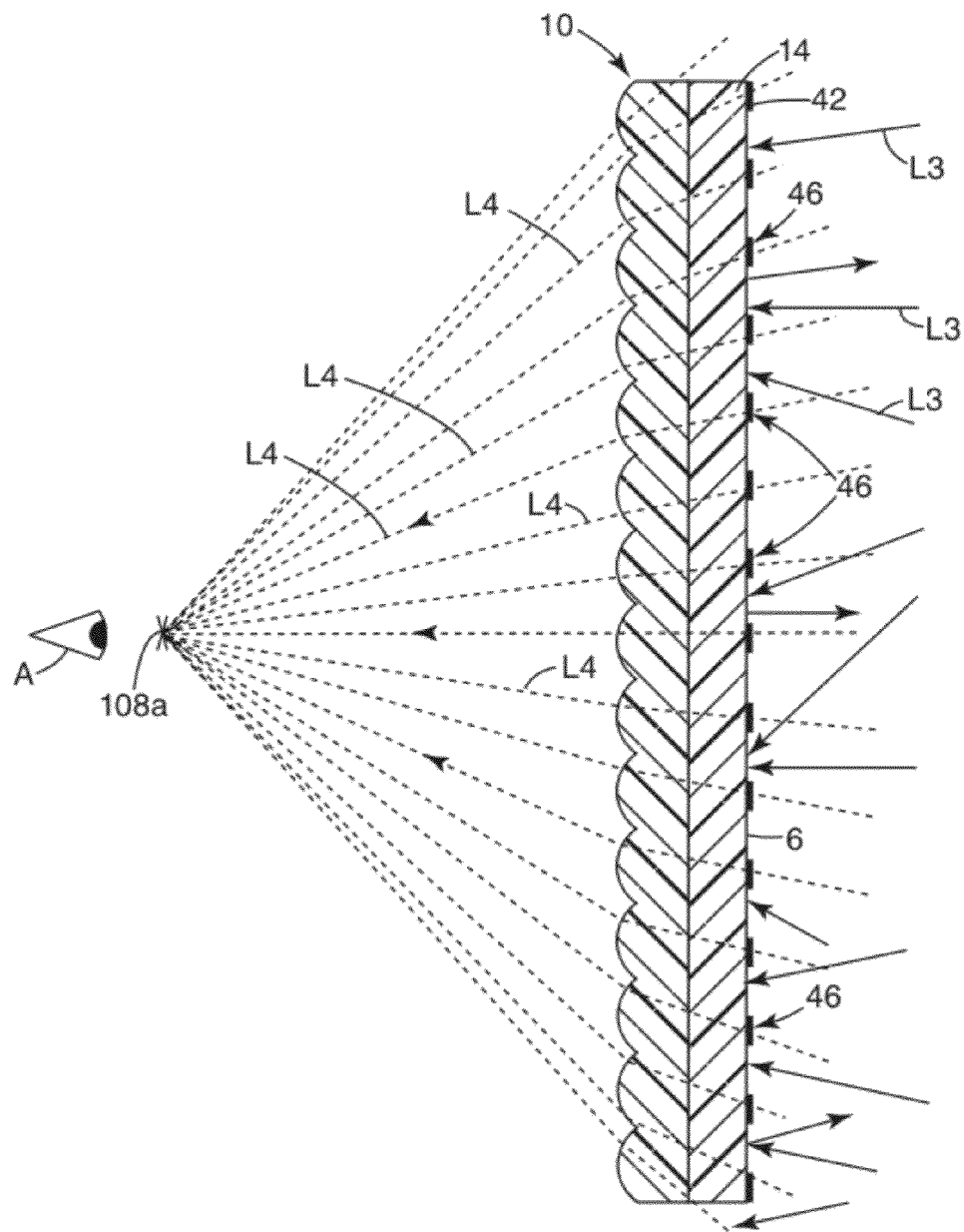
FIG. 22 is a schematic representation of a sheeting having a first composite image that appears to float above the inventive sheeting when the sheeting is viewed in transmitted light.
Figure 26:
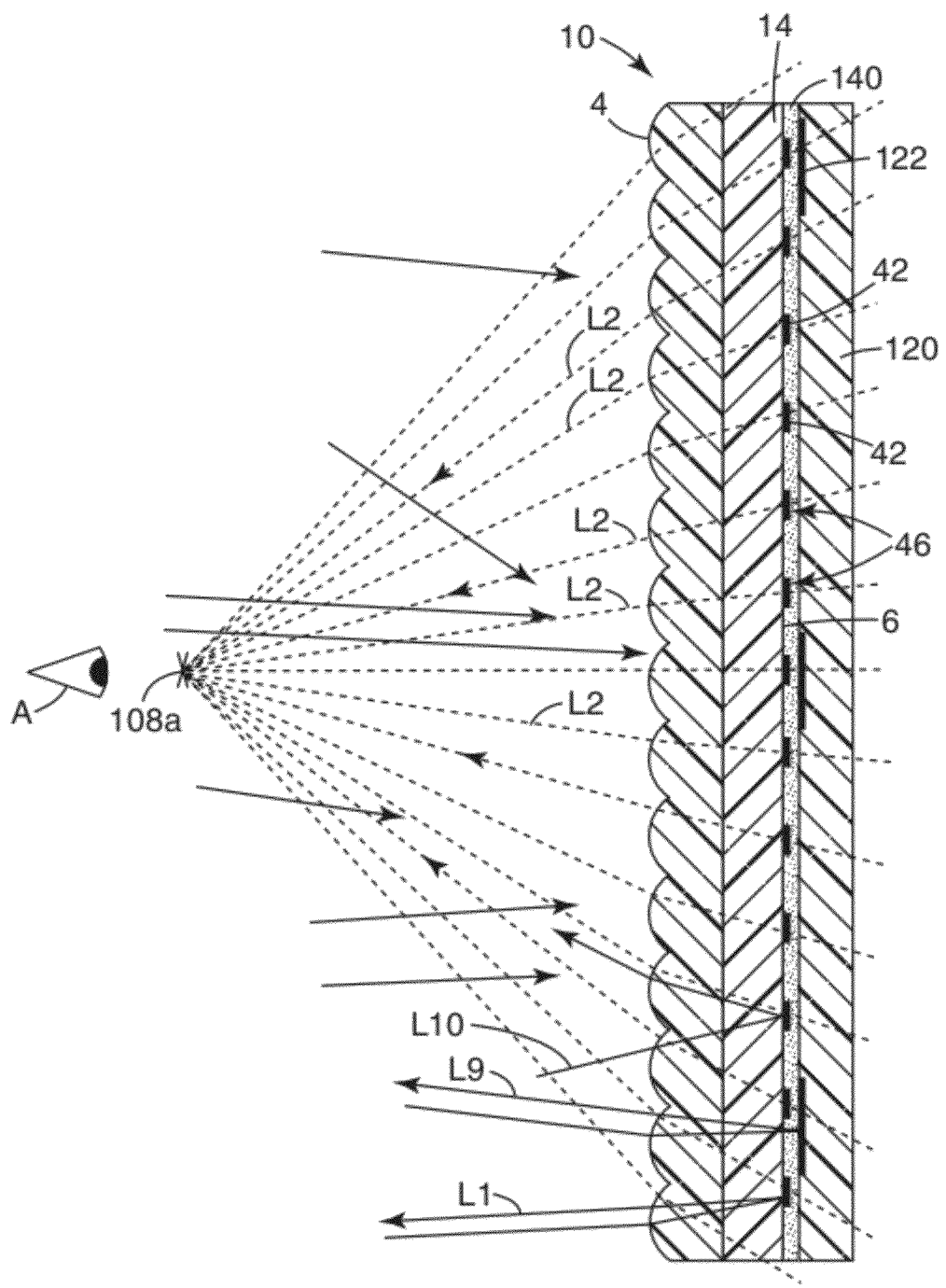
FIG. 26 illustrates one embodiment of the sheeting of the present invention attached to a substrate.

FIG. 26 illustrates the sheeting 10 of FIG. 21 adhered to a substrate or laminate 120. The sheeting 10 may be attached to substrate 80 by a layer of adhesive 140, as illustrated. Alternatively, the sheeting 10 may be integrally formed or embedded into substrate 120. The substrate 120 could be a document, a sign, an identification card, a container, currency, a display, a credit card, or any other form of substrates. The sheeting 10 attached to the substrate 120 could be used for advertising, decoration, authentication, identification purposes, or for any other intended purpose. The substrate 120 may include additional information 122, which may be printed on the substrate 120, which may also be viewable by an observer in addition to the composite image 108a. For example, portions (e.g. a specific wavelength range) of the light L9 may be reflected by the substrate 120 back toward the observer. Light L10 may be reflected off the transferred donor material 42 making the composite image visible to the viewer, along with the embedded or covered graphics 122. The substrate 120 may be translucent, or opaque, or any combination thereof. In another embodiment, the microlens sheeting 10 may include portions with microlens and portions without microlens. The portion without microlenses may be a window for viewing other portions of the microlens sheeting 10 or for viewing portions of a substrate that the microlens sheeting is attached to. Alternatively, the window could include microlenses and the portion around the microlenses may not include microlenses.

E. Viewing a Second Composite Image

A sheeting 10 that has a second composite image 70 may be viewed using light that impinges on the sheeting 10 from the same side as the observer (reflected light), or from the opposite side of the sheeting as the observer (transmitted light), or both.

Figure 27:
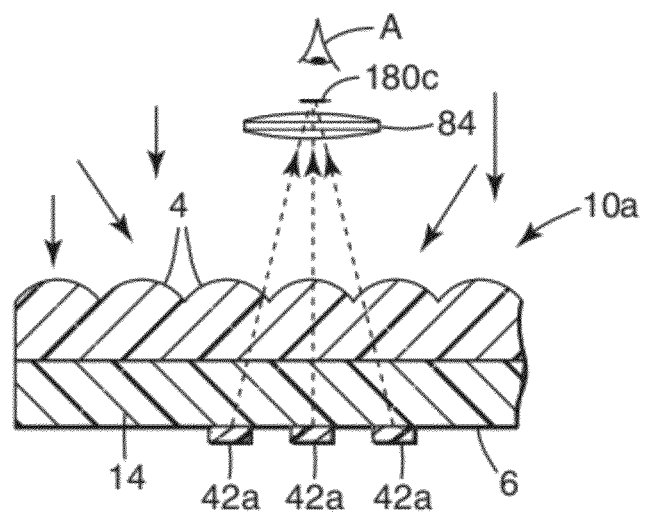
FIG. 27 is a schematic representation of a sheeting having a second composite image that appears to float in the inventive sheeting when the sheeting is viewed in light.

FIG. 27 is a schematic representation of a second composite image FIG. 108c that appears to the aided eye of an observer A to float primarily in the sheeting when viewed under reflected light. In FIG. 27, a magnifying lens 84 is used to view the second composite image. When the imaged sheeting is illuminated by reflected light, which may be collimated or diffuse, light rays are reflected back from the imaged sheeting in a manner determined by the donor material 42 in the individual images 46 struck by the light rays. By definition, the images formed by the donor material 42 appear different than the non-imaged portions of the material layer 14 where no donor material 42 is present, and thus an image can be perceived, and the second composite image can be identified by the user using a magnifier 84.

For example, portions (e.g. a specific wavelength range) of the light may be reflected by the donor material 42 back toward the observer, the summation of which creates a composite image that appears to float in the sheeting, a portion of which is shown at 108c. In short, specific portions of the visible electromagnetic spectrum can be reflected from the imaged portions 46 or reflected from a laminate substrate such as a passport (not shown) and absorbed or scattered by imaged portions 46, which means that a portion of a composite image will be apparent at 108a. However, the donor material 42 may not reflect light back toward the observer well, or at all, or it may significantly absorb light reflected from a laminate surface and subsequently transmitted through the donor material 42. Thus, the observer may detect the absence of light rays at 108c, the summation of which creates a dark colored composite image that appears to float in the sheeting, a portion of which appears at 108c. In short, light may be partially reflected from the entire sheeting or highly reflected from a laminate behind the sheeting except the imaged portions 46, which means that a relatively dark composite image will be apparent at 108c.

It is also possible that the imaged material 42 would reflect or partially absorb incident light, and a dark laminate (not shown) placed adjacent to the imaged portions 46 would absorb the light to provide the contrast effect required to provide a composite image. The composite image under those circumstances would appear as a relatively bright composite image in comparison to the remainder of the sheeting with laminate (not shown), which would appear relatively dark. Various combinations of these possibilities can be selected as desired.

Figure 28:
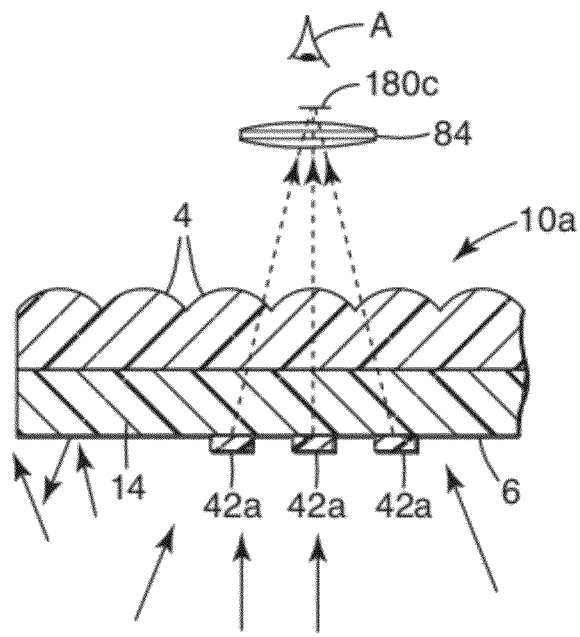

Certain imaged sheetings can also be viewed by transmitted light, as shown in FIG. 28. For example, when the imaged portions of the donor material 42 on the material layer 14 are translucent and absorb portions of the visible spectrum, and the nonimaged portions are transparent or translucent, but highly transmissive, then some light will be selectively absorbed or reflected by the donor material 42, and directed by the microlenses through the magnifier toward the focal point 108c. The composite image will be apparent at the focal point, where it will, in this example, appear darker and colored compared to the remainder of the sheeting.

Figure 29A:
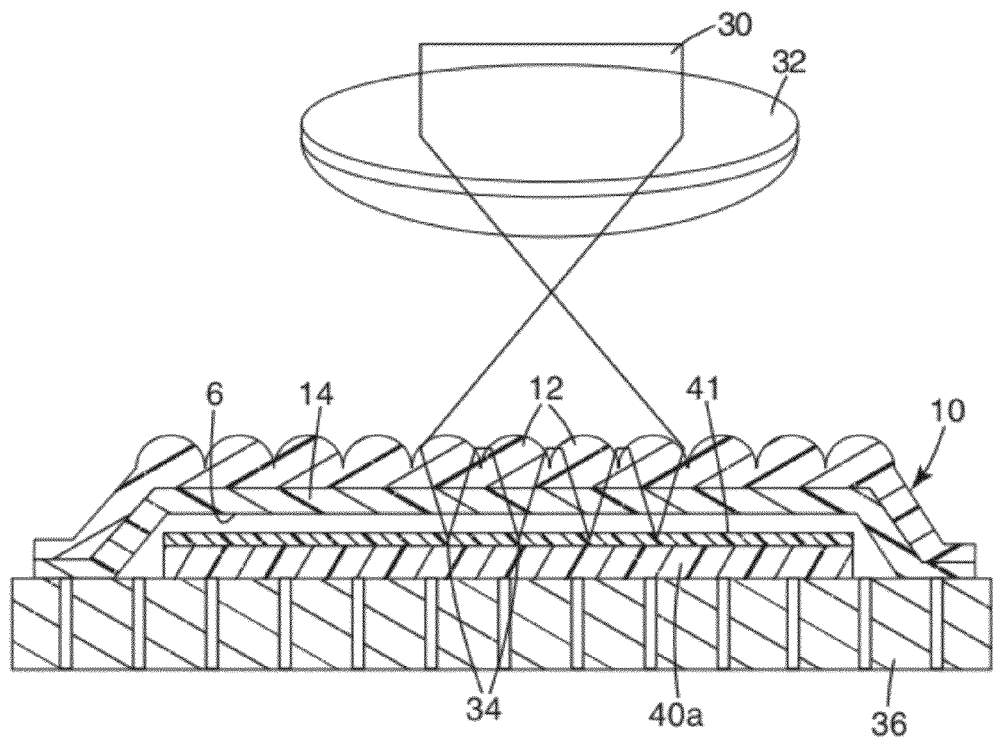
FIGS. 29A-C schematically illustrate one embodiment of another method in accordance with the present invention using a first donor sheet and thereafter removing selected portions of the individual, partially complete images to form a second composite image.
Figure 29B:
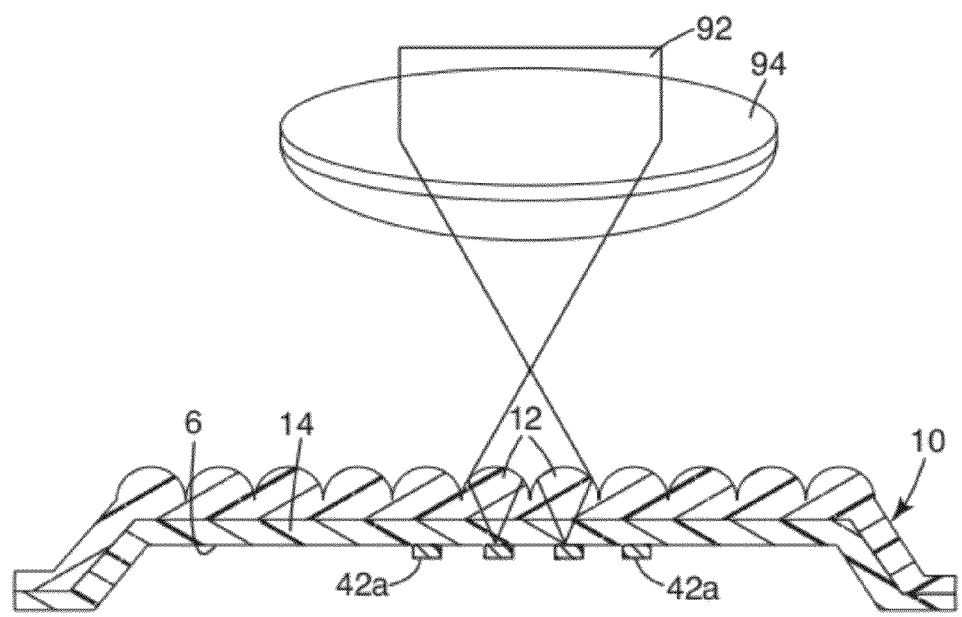
Figure 29C:
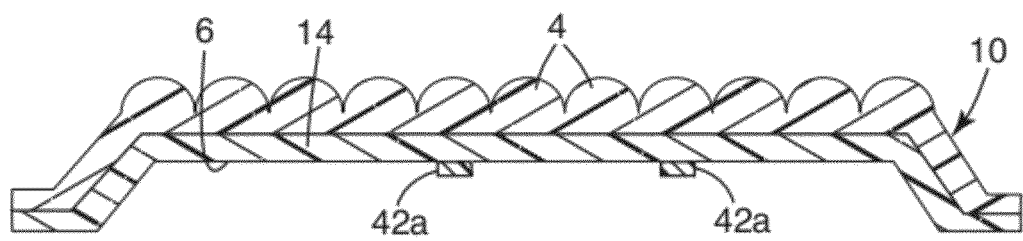

FIGS. 29A-C illustrate schematically another embodiment of the method of the present invention for forming two composite images on a microlens sheeting. In this embodiment, there is a two-part process, first where a portion of the donor substrate is transferred to the sheeting to form individual, partially complete images on the material layer associated with each of a plurality of the microlenses to create a first composite image, and thereafter removing selected portions of the individual, partially complete images using a radiation source to form a second composite image that is also provided by the individual images. The first part of the process is illustrated in FIG. 29A and the second part of the process is illustrated in FIGS. 29B-C.

The first part of the process illustrated in FIG. 29A is principally like the process described in PCT Patent Application Publication, WO 2007/047259, "Methods of Forming Sheeting with a Composite Image that Floats and Sheeting with a Composite Image that Floats," (Endle et al.), the entirety of which is hereby incorporated by reference. Specifically, FIGS. 4a-b, 5a-b, and 6 of WO 2007/047259 broadly describe the process for transferring donor substrate material to the sheeting to form individual, partially complete images on the material layer associated with each of a plurality of the microlenses to create a first composite image.

The second part of the process involves removing selected portions of the individual, partially complete images using the radiation source to form a second composite image. FIG. 29B illustrates one exemplary embodiment of the step of removing different portions of the donor material 42 forming the individual partially complete images 46 with use of a radiation source. FIG. 29C shows the result of the step illustrated in FIG. 29B. However, other methods of removing are contemplated, such as using patterned adhesive.

As illustrated in FIG. 29B, one embodiment of the method includes using a radiation source 92. The radiation source may be used to ablate selected portions of the transferred donor material 42a. Any energy source providing radiation of the desired intensity and wavelength may be used as radiation source 92 with the method of the present invention, so long as the donor material absorbs it. In one embodiment, radiation devices capable of providing radiation having a wavelength of between 270 nanometers and 11 micrometers are preferred, and more preferably, between 270 nanometers and 1.5 micrometers. Examples of high peak power radiation sources useful for this invention include passively Q-switched microchip lasers, the family of Q-switched Neodymium doped lasers, and their frequency doubled, tripled, and quadrupled versions of any of these lasers, and Titanium doped-sapphire (abbreviated Ti:sapphire) lasers. Other examples of useful radiation sources include devices that give low peak power such as laser diodes, ion lasers, non Q-switched solid state lasers, metal vapor lasers, gas lasers, arc lamps and high power incandescent light sources.

For all useful radiation sources, the energy from the radiation source 92 is directed toward the microlens sheeting material 10 and focused at or near to the top surface 6 of the sheeting 10. For energy sources in the ultraviolet, visible, and infrared portions of the electromagnetic spectrum, the light is controlled by appropriate optical elements, known to those skilled in the art. In one embodiment, a requirement of the arrangement of the optical elements, commonly referred to as an optical train, is that the optical train direct light toward the sheeting material and focused at or near to the surface of the sheeting. The composite images of the present invention are preferably obtained by using radiation spreading devices with numerical apertures (defined as the sine of the half angle of the maximum diverging rays) of greater than or equal to 0.15, although smaller numerical aperture illumination may be used. In alternative embodiments, the optical train may additionally contain elements to prevent radiation in an angular portion or portions of the cone of radiation. The resulting composite image(s) are only viewable over angles corresponding to the unblocked angular sections of the modified cone. Multiple composite images may be created at separate angular sections of the modified cone if desired. Alternatively, a mask (not illustrated) may be used between the radiation source and the microlens sheeting 10 to provide a more precise control of radiation directed to sheeting 10. (FIG. 30 described in more detail below is a magnified view of a sheeting that is the result of this method including the optional mask described.)

FIG. 29C illustrates a microlens sheeting 10 after the radiation source 92 has removed selected portions of the donor material 42a on the first side 6 of the layer of material 14. The portions that were removed form the second composite images 70 illustrated in previous Figures. In this case, the absence of donor material between the two remaining donor materials 42a forms a negative contrast second composite image. One exemplary embodiment of removing the donor material is to ablate the portions using the radiation source. By ablate, it is meant to remove or dissipate by melting, vaporizing or erosion.

One advantage of the ablative process described above is the ability to conduct the first part of the process, where portions of donor material are transferred to the sheeting, and the second part of the process, where portions of donor material are removed from the sheeting, at different locations. This allows the flexibility and convenience of creating semi-finished sheeting in one location, and thereafter, finishing the semi-finished sheeting by creating desired second composite images at another location.

Both first and second composite images formed by the process described relative to FIGS. 29A-C have the same attributes described above as the composite images formed by the process described relative to FIGS. 4 A-B and 5A-B. For example, how preferably the second composite is aligned with the first composite image, the second composite images may be either positive contrast or second contrast second composite images, the second composite image may be an angularly variable array of images or appear to scroll relative to the sheeting, etc.

Figure 30:
FIG. 30 is a magnified view of one embodiment of microlens sheeting formed by the method illustrated in FIGS. 29A-C, illustrating the second composite images.

FIG. 30 is a magnified view of a microlens sheeting 10 imaged by the process schematically illustrated by FIGS. 29A-C, including the optional mask described above. The microlens sheeting 10 illustrates multiple second composite images 70a, 70bin the form of the word "Innovation." In this embodiment, the second composite images are negative contrast second composite images.

Figure 31:
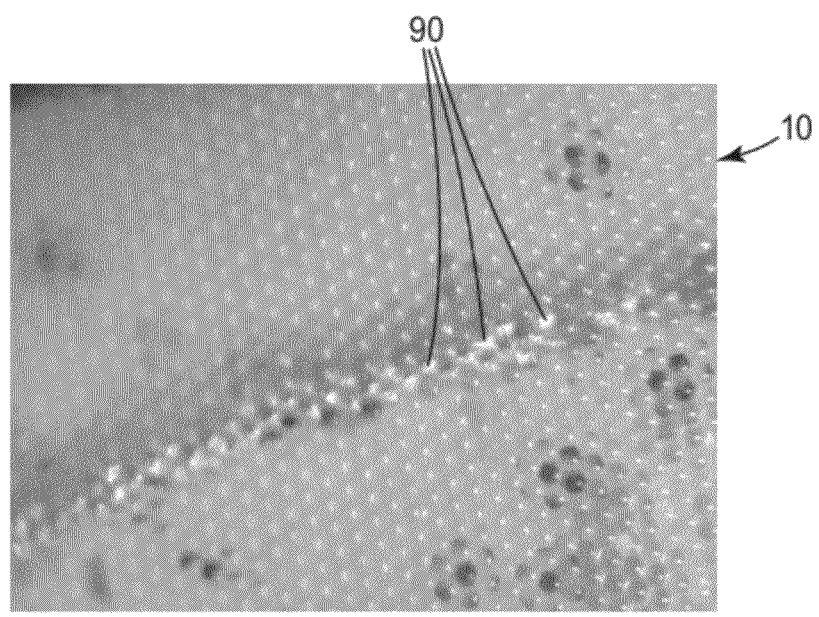
FIG. 31 is a magnified view of one embodiment of microlens sheeting formed by the method illustrated in FIGS. 29A-C, illustrating the reflective characteristics of the sheeting.

FIG. 31 illustrates a magnified view of a microlens sheeting that was formed using the ablative process described above. The ablative process may be controlled or specific materials may be selected to cause the radiation source to remove material in the sheeting (or other layers under the lenses) thereby forming gaseous voids 90 under the lenses.

During the ablation process, the donor material absorbs energy from the laser pulse focused by the lens array 94. The duration of this pulse is very short (generally less than 100 ns). The extremely short pulse length and/or high pulse energy causes the portions of donor material and surrounding materials upon which the laser energy is focused to become superheated. The donor material, polymer, and any locally volatile material vaporize and/or melt and deform rapidly forming a void or "bubble" 90 in the polymer. This gaseous void 90 is very near to the lens focal point and the gases contained within have a refractive index very close to 1.0. The low index void has an interface with the polymer (refractive index ~1.5) near the focal point of the lens. This optically aligns the lens with a partially reflective interface. When viewing the imaged lens sheeting with visible light traveling the same path as the laser (i.e. generally, but not necessarily, using a retroviewer) a reflective scattering feature is observed relative to the background, enhancing the contrast of the microprinted feature, as illustrated in FIG. 31.

Lenco dyes or other dyes in the donor materials that change color when heated or absorb in particular wavelengths may be used in this material forming a second composite image different in color from the first composite image. Composite images made in accordance with the principles of the present invention may appear to be either two-dimensional, meaning that they have a length and width, and appear either below, or in the plane of, or above the sheeting, or three-dimensional, meaning that they have a length, width, and height. Three-dimensional composite images may appear below or above the sheeting only, or in any combination of below, in the plane of, and above the sheeting, as desired. The term "in the plane of the sheeting" refers only generally to the plane of the sheeting when the sheeting is laid flat. That is, sheeting that isn't flat can also have composite images that appear to be at least in part "in the plane of the sheeting" as that phrase is used herein.

Three-dimensional composite images do not appear at a single focal point, but rather as a composite of images having a continuum of, or discrete focal points, with the focal points ranging from one side of the sheeting to or through the sheeting to a point on the other side. This is preferably achieved by sequentially moving either the sheeting or the radiation source relative to the other (rather than by providing multiple different lenses) so as to transfer the donor material adjacent the material layer at multiple focal points to produce images 46 on the surface 6 of material layer 14. The resulting spatially complex image essentially consists of many individual dots. This image can have a spatial extent in any of the three cartesian coordinates relative to the plane of the sheeting.

In another type of effect, a composite image can be made to move into a region of the microlensed sheeting where it disappears. This type of image is fabricated in a fashion analogous to the floating image examples with the addition of placing an opaque mask in front of the microlensed materials to partially block the imaging light for part of the microlensed material. When viewing such an image, the image can be made to move into the region where the imaging light was either reduced or eliminated by the contact mask. The image seems to "disappear" in that region.

In another type of effect, a composite image can be made to change color as viewing angle is changed. This type of image is fabricated in one of several ways, such as blocking an angular portion of the imaging radiation cone for the first donor. The same virtual image is then re-imaged with a second donor with a different colorant, blocking only the portion of the previously unblocked cone.

Images formed by the process of this invention can also be constructed that have a restricted viewing angle. In other words, the image would only be seen if viewed from a particular direction, or minor angular variations of that direction.

This invention will be further explained by the following Examples. The Examples used optical train apparatuses for creating the composite images of this invention which were essentially similar to the optical train apparatuses described in reference to FIGS. 14 and 16 of U.S. Pat. No. 6,288,842 (Florczak et al.). The entire disclosure of U.S. Pat. No. 6,288,842 (Florczak et al.) is hereby incorporated by reference.

EXAMPLES

Example 1

A 5.1×7.6 cm donor sheeting consisting of a polyester base film coated with a 1 g/m² ink layer containing 10% by weight Epolight™ 1178 infrared dye, available from Epolin, Inc., Newark, N.J., and 90% by weight red pigment in a binder, product number 13R1412D, available from Penn Color Inc., Doylestown, Pa., was placed on a vacuum chuck with ink side up. An approximately 7.6×10.2 cm microlens sheeting constructed of 50 micron thick polyethylene terephthalate (PET) base material and 40 micron diameter replicated urethane acrylate plano-convex spherical lenses was placed on top of the donor sheeting with lens side up. The lens focal point was approximately at the back-side of the lens sheeting. Air trapped between the sheetings and vacuum chuck was removed utilizing a hand roller. Then a static pinning device (model Chargemaster CM30-N, P/N: 4010610 power supply with a Pinner™, P/N 4005520 Charging Applicator from SIMCO Industrial Static Control, Hatfield, Pa.) was operated at 18 kV, approximately 5.1-7.6 cm from the surface of the lens sheeting with a sweep rate of approximately 30.5 mm/second across the surface to hold the sheets in position. Next, a negative contrast mask containing clear microtext surrounded by opaque silver halide (i.e., the areas of absence of silver halide on the clear polyester film constituted the microtext) on a 50 micron clear polyester film was placed over the lens of the lenses sheeting. The microtext, an array of the word "Innovation", had an approximately 30 micron line width in the letters.

A floating virtual image with positive contrast microtext was then formed in the lens sheeting. The imaging laser was an IB Laser (~7 ns pulse width, 1000 Hz) operated at 0.6 W (0.6 mJ/pulse). A circle with a diameter of 8 mm was traced out with the laser focal point approximately 6 mm above the surface. A second circle with a 4 mm diameter was traced out with the laser focal point 6 mm below the lens sheeting. In each case, the laser focal point was moved at approximately 25 mm/s. This process formed a floating virtual image consisting of red concentric floating circles, the 8 mm diameter circle appeared to be located at 6 mm above the surface and the 4 mm diameter circle appeared to be located at 6 mm below the surface. The lines of the floating virtual images were comprised of positive contrast microtext which, to the aided eye, appeared to be at the plane of the sheeting.

The sample lens sheeting was placed over a white background and viewed through a 15× magnifier. Microtext was visible and appeared red surrounded by clear polymer. When moving one's eye relative to the magnifier while the magnifier remaining fixed relative to the lens sheeting, the position of the red microtext appeared stationary relative to the sheeting for areas observed on the substrate corresponding to the circles imaged at both +6 mm and −6 mm float height. The microtext appeared as a scrolling effect, i.e. when the sample was tilted, the microtext moved with the direction of the tilt for the areas imaged at a negative float height of the virtual image (−6 mm) and in the opposite direction for microtext associated with the positive float height image of the virtual image (+6 mm). In both cases, positive or negative height of the floating virtual image, the microtext on the leading edge of the viewed area became visible at the same rate as microtext on the trailing edge disappeared, i.e. an observed scrolling effect.

Example 2

A microlens sheeting sample was prepared identical to that in Example 1, except that the positive contrast mask contained opaque microtext surrounded by clear polymer.

This process formed a floating virtual image consisting of two red concentric floating circles, an 8 mm diameter circle that appeared to be located at 6 mm above the surface and a 4 mm diameter circle that appeared to be located 6 mm below the surface. The sample was placed over a white background and viewed through a 15× magnifier. The lines of the floating virtual images were comprised of negative contrast microtext which appeared to be in the plane of the sheeting. Microtext appeared clear and was surrounded by red. When moving one's eye relative to the magnifier while the magnifier remaining fixed relative to the lens sheeting, the position of the clear microtext appeared stationary relative to the sheeting for areas observed on the substrate corresponding to the circles imaged at both +6 mm and −6 mm float height. For imaged areas associated with the −6 mm circle, the microtext appeared to move with the direction of the tilted sample and the microtext corresponding to the +6 mm circle appeared to move opposite the direction of the tilted sample. This created a scrolling effect, such that the microtext moved over the surface, and microtext on the leading edge became visible while microtext on the trailing edge disappeared.

Example 3

A 14×19 cm donor sheeting consisting of a polyester base film coated with an approximately 1 g/m2 layer of black ink, product number 13B1428D, available from Penn Color Inc., Doylestown, Pa., was placed on a vacuum chuck with ink side up. An approximately 20.3×25.4 cm microlens sheeting constructed of 50 micron thick polyethylene terephthalate (PET) base material and 40 micron diameter replicated urethane acrylate plano-convex spherical lenses was placed on top of the donor sheeting with lens side up. The lens focal point was approximately at the backside of the microlens sheeting. Air trapped between the sheetings and vacuum chuck was removed utilizing a hand roller. Then, a static pinning device (model Chargemaster CM30-N, P/N: 4010610 power supply with a Pinner™, P/N 4005520 Charging Applicator from SIMCO Industrial Static Control, Hatfield, Pa.) was operated at 18 kV, approximately 5.1-7.6 cm from the surface of the lens sheeting with a sweep rate of approximately 30.5 cm/second across the surface to hold the sheets in position.

A black floating virtual image was then formed in the lens sheeting. The imaging laser was an IB Laser (~7 ns pulse width, 1000 Hz) operated at 0.23 W (0.23 mJ/pulse). A floating sinusoidal wave was traced out with the laser focal point approximately 6 mm above the surface. A text graphic floating virtual image "OK" was traced out, between sections of the sinusoidal wave segments, with the laser focal point 6 mm below the lens sheeting. For each floating virtual image, the laser was scanned at approximately 10 mm/s.

The lens sheeting was then laminated to a polyvinyl chloride composite card using a polyvinyl alcohol-based pressure sensitive adhesive (P1410, available from 3M, St. Paul, Minn.).

The laminated card with floating virtual images was placed on a flat surface underneath a scan lens at the laser focal point. A 20 watt laser (Model #YLP-1/100/20, from IPG Photonics, Oxford, Mass.) operated at 18% power, provided a 1064 nm wavelength beam with pulses at a 70 kHz frequency and a pulse width of approximately 100 ns. The word "microtext" was scanned over a portion of the sinusoidal wave with the laser scanned at 2 m/s.

Black pigment was ablated in the areas affected by the laser, forming the microtext within the black virtual image. The word "microtext" was visible with a 15× magnifier. The word "microtext" was approximately 3.5 mm long with line widths of approximately 100 microns. When a retroviewer was placed in optical alignment between the eye and the magnifier, the contrast of the word "microtext" with the surrounding background was significantly enhanced, i.e. the word appeared bright white,.

Example 4

A 14×19 cm donor sheeting consisting of a polyester base film coated with an approximately 1 g/m² layer of black ink, product number 13B1428D, available from Penn Color Inc., Doylestown, Pa., was placed on a vacuum chuck with ink side up. An approximately 20.3×25.4 cm lens sheeting constructed of 50 micron thick polyethylene terephthalate (PET) base material and 40 micron diameter replicated urethane acrylate plano-convex spherical lenses was placed on top of the donor sheeting with lens side up. The lens focal point was approximately at the lens sheeting back-side. Air trapped between the sheetings and vacuum chuck was removed utilizing a hand roller. Then, a static pinning device (Chargemaster CM30-N, P/N: 4010610 power supply with a Pinner™, P/N 4005520 Charging Applicator from SIMCO Industrial Static Control, Hatfield, Pa.) was operated at 18 kV, approximately 5.1-7.6 cm from the surface with a sweep rate of approximately 30.5 cm/second across the surface to hold the sheets in position.

A black floating virtual image was then formed in the lens sheeting. The imaging laser was an IB Laser (~7 ns pulse width, 1000 Hz) operated at 0.23 W (0.23 mJ/pulse). A floating continuous sinusoidal wave was traced out with the laser focal point approximately 8 mm below the surface. A text graphic floating image "OK" was traced out, between sections of the sinusoidal wave segments, with the laser focal point 8 mm above the lens sheeting. For each floating image, the laser was scanned at approximately 10 mm/s.

This lens sheeting was then laminated to a polyvinyl chloride composite card using a polyvinyl alcohol-based pressure sensitive adhesive (P1410, available from 3M Co., St. Paul, Minn.).

The laminated card with floating virtual images was placed on a flat surface underneath a scan lens at the laser focal point. Next, a negative contrast mask containing clear microtext surrounded by opaque silver halide (i.e., the areas of absence of silver halide on the clear polyester film constituted the microtext) on a 50 micron clear polyester film was placed over the lenses of the lens sheeting in the area that contained the "OK". The microtext was an array of the word "Innovation", with a line width of approximately 60 microns in the letters.

A 20 watt laser (Model #YLP-1/100/20, from IPG Photonics, Oxford, Mass.) operated at 20% power provided a 1064 nm wavelength beam with pulses at a 70 kHz frequency and a pulse width of approximately 100 ns. A series of 29 lines was drawn at 2 m/s over the mask to expose an area approximately 7.6×7.6 mm.

Black pigment was ablated in the areas affected by the laser, forming the microtext within the black virtual image. The word "Innovation" was visible with an 8× magnifier. When a focused light source or retroviewer was placed in optical alignment between the eye and the magnifier, the contrast of the word "Innovation" was significantly enhanced, i.e. the word appeared bright white.

We claim:

1. A sheeting comprising:
   an array of microlenses;
   a material layer adjacent the array of microlenses, wherein the material layer comprises a first side and a second side opposite the first side, and wherein the second side is adjacent the array of microlenses;
   a first donor material in contact with the material layer, wherein the donor material forms at least two individual, partially complete images on the material layer associated with each of a plurality of the microlenses;
   a first composite image, provided by at least one of the individual images, that appears to an unaided eye to float above or below the sheeting, or both;
   a second composite image, provided by at least one of the individual images, that appears to an aided eye to float above, in, or below the sheeting, or any combination thereof,
   wherein the first donor material comprises a colorant, wherein at least a portion of the first or second composite image exhibits a color similar to the colorant in the first donor material, and wherein the second composite image includes micrographics.

2. The sheeting of claim 1, wherein the second composite image is aligned with the first composite image.

3. The sheeting of claim 1, wherein the individual, partially complete images on the material layer associated with each of a plurality of the microlenses form positive contrast second composite images.

4. The sheeting of claim 1, wherein the individual, partially complete images on the material layer associated with each of a plurality of the microlenses form negative contrast second composite images.

5. The sheeting of claim 1, wherein the first composite image also appears to the unaided eye to be at least in part in the plane of the sheeting.

6. The sheeting of claim 1, wherein the first donor material comprises radiation sensitive material.

7. The sheeting of claim 1, wherein the second composite image appears to move relative to the sheeting as the viewing position changes relative to the sheeting.

8. The sheeting of claim 1, wherein the second composite image is an angularly variable array of images.

9. The sheeting of claim 8, wherein the second composite image appears to scroll relative to the sheeting.

10. The sheeting of claim 1, wherein the eye is aided by magnification.

11. The sheeting of claim 10, wherein the second composite image is viewable under magnification.

12. A method of forming two composite images on a microlens sheeting, comprising the steps of:
   providing a sheeting having an array of microlenses and a material layer adjacent the array of microlenses, wherein the material layer comprises a first side and a second side opposite the first side, and wherein the second side is adjacent the array of microlenses;

providing a mask adjacent the array of microlenses of the sheeting;

providing a first donor substrate adjacent the material layer of the sheeting, wherein the first donor substrate is radiation sensitive, and wherein the first donor substrate comprises a colorant;

providing a radiation source; transferring at least a portion of the first donor substrate to the sheeting using the radiation source and the mask to form at least two individual, partially complete images on the material layer associated with each of a plurality of the microlenses, whereby the sheeting exhibits a first composite image, provided by at least one of the individual images, that appears to an unaided eye to float above or below the sheeting, or any combination thereof, wherein the sheeting exhibits a second composite image, provided by at least one of the individual images, that appears to an aided eye to float above, in, or below the sheeting, or any combination thereof, and wherein at least a portion of the first or second composite image exhibits a color similar to the colorant in the first donor substrate, and wherein the second composite image includes micrographics.

13. The method of claim 12 further comprising the step of: removing the first donor substrate;

providing a second donor substrate adjacent the material layer of the sheeting, wherein the second donor substrate is radiation sensitive; and repeating the transferring step with the second donor substrate.

14. The method of claim 13, wherein the second donor substrate comprises a colorant different from the colorant of the first donor substrate.

15. The method of claim 12, wherein the first composite image also appears to be at least in part in the plane of the sheeting.

16. The method of claim 12, wherein the mask assists in forming either positive contrast or negative contrast second composite images.

17. The method of claim 12, wherein the second composite image is an angularly variable array of images.

18. The method of claim 17, wherein the second composite image appears to scroll relative to the sheeting.

19. The method of claim 12, wherein the eye is aided by magnification, and wherein the second composite image is viewable under magnification.

20. The method of claim 12, wherein the eye is aided by a viewer having specific wavelengths of light, and wherein the second composite image is viewable using the specific wavelengths of light.

21. The method of claim 12, wherein the transferring step transfers portions of the first donor material to the first side of the material layer.

* * * * *

UNITED STATES PATENT AND TRADEMARK OFFICE
CERTIFICATE OF CORRECTION

PATENT NO.       : 8,537,470 B2  
APPLICATION NO.  : 13/344718  
DATED            : September 17, 2013  
INVENTOR(S)      : James P Endle It is certified that error appears in the above-identified patent and that said Letters Patent is hereby corrected as shown below:

Title Page 3, Column 2 Item (56) (Other Publications)
Line 17, delete "Photgraphing" and insert -- Photographing --

Line 17, delete "Photograpy" and insert -- Photography --

Line 21, delete "Maschinostroenive," and insert -- Mashinostroenie, --

In the Drawings – Sheet 21 of 24
FIG. 27, delete "180c" and insert -- 108c --

FIG. 28, delete "180c" and insert -- 108c --

In the Specification
Column 1
Line 40, delete "inks" and insert -- inks. --

Column 3
Line 28, delete "thereof" and insert -- thereof; --

Column 4
Line 16, delete "the a" and insert -- the --

Line 20, delete "eye." and insert -- eye; --

Column 5
Line 16, delete "FIG. 29" and insert -- FIG. 28 --

Line 26, delete "images ;and" and insert -- images; and --

Signed and Sealed this  
Eighth Day of April, 2014

Michelle K. Lee  
*Deputy Director of the United States Patent and Trademark Office*

Column 11
Lines 2-31, after "above" delete "Next, the ……… in the art." And insert the same on Column 11, line 3, as a new paragraph.

Column 13
Line 39, delete "Aperature" and insert -- Aperture --

Line 49, delete "18A-D," and insert -- 18A-D. --

Column 15
Line 54, delete "a the" and insert -- a --

Column 18
Line 26, delete "realty," and insert -- reality, --

Column 25
Line 28, delete "form" and insert -- from --

Line 59, delete "70bin" and insert -- 70b in --

Column 26
Line 21, delete "Lenco dyes" and insert -- Leuco dyes --

Column 28
Line 42, delete "1 g/m2" and insert -- 1 g/m$^2$ --

Column 29
Line 21, delete "white,." and insert -- white. --

In the Claims
Column 30
Line 60, in claim 11, delete "vieweable" and insert -- viewable --

Column 32
Line 19, in claim 19, delete "vieweable" and insert -- viewable --